(12) United States Patent
Poornachandran et al.

(10) Patent No.: US 12,251,816 B2
(45) Date of Patent: Mar. 18, 2025

(54) AUTOMATED MACHINE COLLABORATION

(71) Applicant: Intel Corporation, Santa Clara, CA (US)

(72) Inventors: Rajesh Poornachandran, Portland, OR (US); Omesh Tickoo, Portland, OR (US); Anahit Tarkhanyan, Cupertino, CA (US); Vinayak Honkote, Bangalore (IN); Stanley Mo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 939 days.

(21) Appl. No.: 17/130,030

(22) Filed: Dec. 22, 2020

(65) Prior Publication Data

US 2021/0107153 A1 Apr. 15, 2021

(51) Int. Cl.
*B25J 13/00* (2006.01)

(52) U.S. Cl.
CPC ... *B25J 13/006* (2013.01); *G05B 2219/32328* (2013.01)

(58) Field of Classification Search
None
See application file for complete search history.

(56) References Cited

U.S. PATENT DOCUMENTS

| 2020/0016754 A1 | 1/2020 | Skubch |
| 2020/0030965 A1 | 1/2020 | Stilwell |
| 2020/0282549 A1 | 9/2020 | Torii et al. |

OTHER PUBLICATIONS

European Search Report issued for the corresponding European Application No. EP 21 19 5750.1, dated Feb. 28, 2022, 9 pages (for informational purposes only).

*Primary Examiner* — Sean Shechtman
(74) *Attorney, Agent, or Firm* — Viering, Jentschura & Partner mbB

(57) ABSTRACT

According to various aspects, controller for an automated machine may include: a processor configured to: compare information about a function of the automated machine with information of a set of tasks available to a plurality of automated machines; negotiate, with the other automated machines of the plurality of automated machines and based on a result of the comparison, which task of the set of tasks is allocated to the automated machine.

12 Claims, 14 Drawing Sheets

AUTOMATED MACHINE COLLABORATION

TECHNICAL FIELD

Various aspects of this disclosure generally relate to methods and systems of collaboration among automated machines and controllers and code segments thereof.

BACKGROUND

Automated machines may replace or assist humans for various tasks and other services. Industry 4.0 brings digital and physical technologies together to create responsive, interconnected operations. Solutions designed for the Industrial Internet of Things (IIoT) use connected sensors and edge devices to help improve product quality and factory operational efficiency in real time. Automated machines may be incorporated in industrial environments, manufacturing, and delivery environments to make informed and timely decisions.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
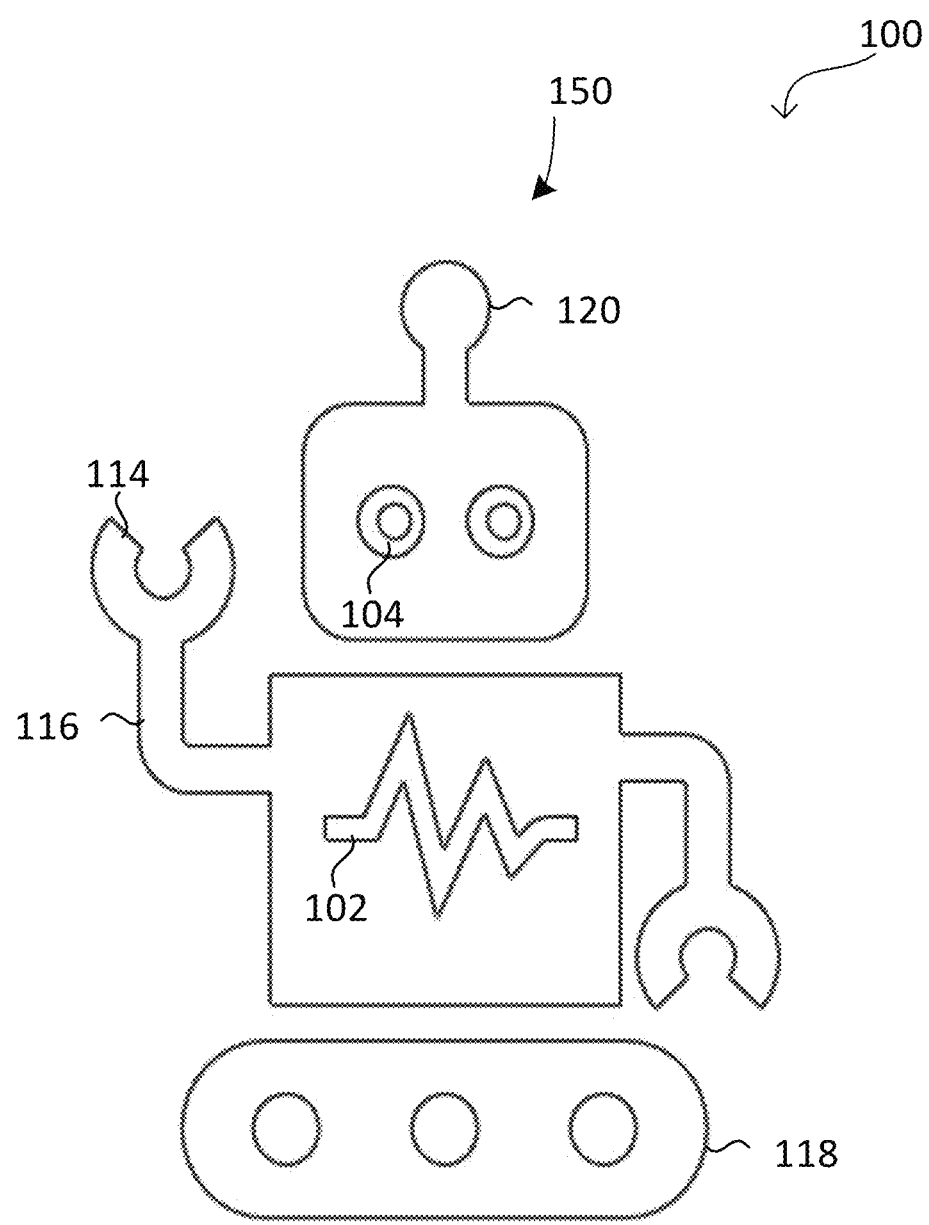
FIG. 1 shows an example of a machine in accordance with various aspects of the present disclosure.

The following detailed description refers to the accompanying drawings that show, by way of illustration, exemplary details and aspects in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as used herein may be understood as any kind of technological entity that allows handling of data. The data may be handled according to one or more specific functions that the processor or controller may execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where radio-layer components carry out the physical transmission and reception, such as radio frequency (RF) transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions. The term "calculate" encompasses both 'direct' calculations via a mathematical expression/formula/relationship and 'indirect' calculations via lookup or hash tables and other array indexing or searching operations.

A "machine" may be understood to include any type of mechanical structure that uses (e.g., electrical) power to alter its environment, to apply forces, to control movement and/or to perform an intended action, e.g., a mechanical structure programmable by a computer. By way of example, a machine may be a driven object with a combustion engine, a reaction engine, an electrically driven object, a hybrid driven object, or a combination thereof. A machine may be or may include a humanoid machine, a non-humanoid machine, an agricultural machine, a machine tool, a moving machine, a stationary machine, a drone, an industrial machine, a medical operating machine, a collectively operating machine, a ground machine, an aerial machine, an aquatic machine, or a mixture thereof, among others.

A "ground machine" may be understood to include any type of machine, as described above, which is configured to traverse the solid ground, e.g., within a building, as part of a production line, on a street, on a road, on a track, off-road, etc. An aerial machine may be understood to include any type of machine, as described above, which is configured lift itself, e.g., to fly or hover.

An "aquatic machine" may be understood to include any type of machine, which is configured to travel on, just above the surface or below the waterline. It may float, be a submersible or travel upon the surface of the water as in a hydrofoil.

The term "automated machine" as used herein (also referred to as a at least partially autonomous machine or as robot) may describe a machine capable of managing one or more tasks (also referred to as task performance) at least partially without human intervention, input, and/or control. Examples of the automated machine may include a hybrid machine, a human assisted machine and/or an autonomous machine. The term "autonomous machine" as used herein (also referred to as autonomous robot) may describe a (e.g., automated) machine capable of managing one or more tasks (also referred to as task performance) without human intervention, input, and/or control. Exemplary components of managing task may include: managing one or more physical tasks (also referred to as task management), planning the task performance, organizing the task performance, scheduling the task performance, switching between two tasks, competing for one or more task, assigning one or more tasks, completing one or more tasks, reporting about completion of the one or more tasks, negotiation of the allocation of one or more tasks (e.g., between multiple autonomous machines), monitoring the progress of one or more tasks, navigate the autonomous machine to one or more positions of one or more tasks (e.g., at which the one or more task require a physical manipulation), etc. References made herein to robots or automated machines may be understood as exemplarily and may analogously apply to any type of autonomous machine, and vice versa. References made herein with regard to one or more autonomous machines may analogously apply to one or more automated machines. According to various aspects, the task management may be collaborative, e.g., when multiple robots are allocated to one or more tasks. The robots implementing the collaborative task management may be configured to exchange data related to the task management.

The task performance may include processing one or more workpieces, e.g., by adding material to the workpiece, removing material from the workpiece, transforming the workpiece and the like. The autonomous machine may implement one or more task performance models, e.g., a respective controller of the autonomous machine may implement the one or more task performance models. A task performance model may be configured to control the task performance by the autonomous machine based on input data, e.g., to convert the input data into control instructions. The controller may be configured to transmit the control instructions within the autonomous machine, e.g., in accordance with an in-machine communication protocol (e.g., a fieldbus communication protocol) and/or to one or more actuators of the autonomous machine. Generally, a task performance model may be (e.g., at least in part) rule based and/or may be (e.g., at least in part) based on machine learning.

Examples of the input data may include: data that one or more of the sensors of the autonomous machine sensed, data that the autonomous machine stores (e.g., in a database), data indicating instructions provided to the autonomous machine (e.g., data that an operator or a group leader receives), data about an affiliation of the autonomous machine to a group (also referred to as group affiliation), data about an assignment of the autonomous machine to one or more tasks of the group, data exchanged between multiple autonomous machines (e.g., data transmitted from another autonomous machine of the group), and/or data about a mission (also referred to as mission data). The control instructions may be understood as in-machine instructions to control one or more actuators of the autonomous machine. Examples of the one or more actuators of the autonomous machine may include: one or more actuators configured to cause a motion of the autonomous machine, one or more actuators configured to actuate a tool of the autonomous machine, one or more actuators configured to move the tool (also referred to as effector) of the autonomous machine (e.g., relative to the one or more actuators configured to cause a motion of the autonomous machine), one or more actuators being part of the kinetic chain (e.g., a robotic arm) of the autonomous machine.

For example, the task performance may be based on sensed data (also referred to as sensing result, sensor data, or as sensing data), e.g., measurements by one or more sensors of the autonomous machine or measurements by one or more sensors external to the autonomous machine (e.g., one or more sensors of another autonomous machine). For example, the task performance may be based on information about the environment of the autonomous machine, e.g., information that the one or more sensors of the autonomous machine sensed or information that one or more external sensors sensed. Alternatively, the task performance may be based on a progress of performing one or more tasks that the autonomous machine performs. For example, one or more sensors of the autonomous machine or the one or more external sensors may be configured to sense the progress of performing the one or more tasks that the autonomous machine performs. For example, task performance may include navigating the machine according to one or more positions, at which the machine performs one or more tasks.

Performing one or more tasks may include one or more actions of the autonomous machine, e.g., one or more spatially distributed actions (e.g., a spatial sequence of actions) and/or one or more spatially chronological actions (e.g., in a chronologic sequence of operations). The spatial distribution of multiple actions (also referred to as machine actions) may indicate, where (i.e., with which spatial relation) and/or in which direction the autonomous machine provides the one or more actions, i.e. in which corresponding spatial position (i.e. position and/or orientation) the autonomous machine or its tool is located.

The one or more tasks may be represented (e.g., logically) by data (also referred to as mission data). A mission may refer to one task or a group of multiple tasks, which are related to each other, e.g., contextually or logically related to each other (for example, tasks directed to the fabrication of a certain product, tasks directed to the exploration of a certain are, and the like). The mission data may be a formal representation of the mission. Examples of the mission data may include: data identifying each task (also referred to as task identifier), data organizing each task (e.g., spatial and/or chronological data), data indicating the criteria under which a task is fulfilled, data indicating goals of each task, data identifying criteria for triggering, terminating, or maintaining a task, etc. Furthermore, the mission data may include a mission logic, which logically links tasks, priorities, criteria, conditions and/or tasks and/or which implements a sequence (e.g., a flow chart), according to which the mission is executed. For example, the mission logic may organize the mission hierarchically, e.g., into hierarchical levels, hierarchical groups, subtasks, and the like. For example, a task may include multiple subtasks on a lower hierarchical level, which may be, but not need to be, prioritized, contextual based and/or conditional. Viewed from the hierarchical level of the subtask, the subtask may also be referred to as task, and may include, but not need to include, multiple subtasks.

For example, the mission logic may organize the mission in accordance with conditional aspects and/or contextual aspects. For example, the mission logic may define conditional tasks, e.g., by defining conditions/requirements to be fulfilled for starting a task performance and/or for ending a task performance.

Herein the term "collaborate", "collaborative", "collaboration" refers to entities, such as devices (a plurality of autonomous machines), methods and functions, as examples, participating to accomplish a mission. Examples of the collaborative entities may include various types of agents or actors, such as automated machines (e.g., partially of fully autonomous machines), humans, non-automated machines, or non-autonomous machines. Multiple entities (e.g., autonomous machines) participating in the mission may be affiliated (e.g., assigned) to a group (herein also referred to as group, swarm or as team), e.g., being members (also referred to as agents or as nodes) of the group. Multiple autonomous machines participating in the mission may be affiliated (e.g., assigned) to a group of autonomous machines (herein also referred to as group, swarm or as team), e.g., being members (also referred to as agents or as nodes) of the group of autonomous machines. Each group (e.g., of autonomous machines) may be entrusted with one or more missions. References made herein with respect to a group of autonomous machines may analogously apply to a group of entities, e.g., including various types of agents or actors, such as automated machines (e.g., partially of fully autonomous machines), humans, non-automated machines, or non-autonomous machines. The autonomous machine may be configured to collaborate with one or more other autonomous machine, e.g., by implementing one or more protocols (also referred to as collaboration protocols). Examples of collaboration protocols may include: a protocol for group management (also referred to as group management protocol), a protocol for communication (e.g., data exchange) between members of a group of collaborating autonomous machines (also referred to as group communication protocol), a protocol for managing tasks of the mission (also referred to as task management protocol). Generally, a protocol may define rules that indicate the format, syntax, semantics and/or synchronization of information, e.g., of information transfer (e.g., exchange), information storage, information processing, and the like. For example, the autonomous machine may form, join and/or leave a group in accordance with the group management protocol. For example, the autonomous machine may be configured to communicate with other members of the group in accordance with the group communication protocol. For example, the autonomous machine may be configured to exchange sensed data or exchange model data with other members of the group in accordance with the group communication protocol (also referred to as data exchange protocol). For example, a group identifier used to route a message generated in accordance with the group communication protocol to the group. The automated machine may be configured to broadcast the message to all members of the group, and/or a member identifier or topical filter may route the message to individual members of the group. For example, the autonomous machine may be configured to manage the task performance in accordance with the task management protocol, e.g., synchronizing mission data and/or the status (e.g., the progress and/or accomplishment) of one or more tasks of the mission.

The term "target information" may indicate the respective information of interest about the environmental property. The target information may include various types of information about the environment of the sensor, which are based on the sensing process that the sensor performs, e.g., a result thereof. According to various aspects, the target information may include information about one or more logic, geometric, kinematic, mechanical, radiometric (e.g., photometric), thermodynamically, electrical and/or chemical properties of the environment of the sensor, which are based on the sensing process that the sensor performs, e.g., on a result thereof. This is reflected by the type of the target information, which may be a logical type, geometrical type, kinematical type, mechanical type, radiometrical type (e.g., photometric type), thermodynamical type, electrical type and/or chemical type.

The term "result" with regard to a sensing process (also referred to as sensing result or as result of the sensing process) may refer to an interim stage of data that the sensing chain processes and/or to the target information as output of the processing chain. Examples of the sensing result may include: sensor raw data, an aggregation of raw data, pre-processed (e.g., filtered and/or converted) raw data, a quantized result of processing the sensor raw data, e.g., including numerical information about the sensed property (e.g., one or more values of the sensed property), a classified result of processing the sensor raw data, an estimation made based on the raw data (e.g., output of a model), etc. Examples of the result of an image acquisition as sensing process, may include pixel raw data, the image data based on the raw data, a video, the result of an object recognition based on the image data, a spectral composition, a light intensity value, a distance determined based on the image data, etc.

Various aspects herein may utilize one or more machine learning models to perform or control functions of the machine (or other functions described herein). The term "model" used herein may be understood as any kind of algorithm, which provides output data based on input data provided to the model (e.g., any kind of algorithm generating or calculating output data based on input data). A computing system may execute a machine learning model to progressively improve performance of a specific task. In some aspects, parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify environmental conditions, such as weather conditions and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

For example, the controller of an autonomous machine may be configured to train the task performance model based on training data. The training data may include the control instructions, a result of the task performance (also referred to as actual result) and/or a predefined result (also referred to as expected result or target result). For example, the controller may be configured to determine the result of the task performance by sensing the environment of the machine. For example, the predefined result may represent an optimum result or a range of results that are acceptable. Said more generally, the training data may indicate whether the result of the task performance fulfills a predefined criterion, e.g., by comparing the actual result with the predefined result. For example, the criterion may be fulfilled when a deviation of the actual result from the predefined result is zero.

Generally, the actual result and/or the predefined result may be parameterized, e.g., represented by data (also referred to as result data) including one or more parameters as information about the result. For example, the result data may include sensed parameters, such as physical, electrical and/or chemical properties of the result.

Throughout the present disclosure, the following terms may be used as synonyms: parameter set, model parameter set, safety layer parameter set, automated motion model parameter set, and/or the like. These terms may correspond to groups of values used to implement one or more models for directing an autonomous machine to operate according to the manners described herein.

Furthermore, throughout the present disclosure, the following terms may be used as synonyms: parameter, model parameter, safety layer parameter, and/or automated movement model parameter, and/or the like, and may correspond to specific values within the previously described sets.

In theory, a multi-functional autonomous robot has the capabilities for carrying out a wide variety of tasks in an execution pipeline. However, at present, such an autonomous robot is configured to act as a specialized robot and used with limited functional capability to perform specific tasks within the execution pipeline. Statically configured specialized robots with human task configuration is the norm in industry today, leading to expensive deployments and limited scalability of robot platforms in different industries. One of the reasons for this limitation is the task configuration heavy lift, including tuning/optimization of hardware and/or software towards the specialty tasks. This limitation is associated with several drawbacks. As an example, specializing multifunction robots to specific subtasks can limit solution and deployment scalability. As another example, specialization requires new (and niche) hardware and software configuration for each task limiting robot migration across subtasks. Conventionally, there is no practical mechanism to scale up or down functional capabilities based on collaborative environment needs. As a further example, this also increases human effort for configuration and re-configuration of robots that translates to cost of deployment and support.

Various aspects may be based on the realization that allowing autonomous machines to dynamically allocate tasks among themselves based on a current scenario (e.g., based on a mission) may provide an optimized execution of the tasks. Rather than statically assign a plurality of autonomous machines each to a specific task, the autonomous machines may be, in various aspects, free to decide how to best distribute the tasks (e.g., in a mission) among themselves based on the respective capabilities. Illustratively, the autonomous machines may be, in various aspects, free to discuss (e.g., to negotiate) among themselves how to best distribute the tasks. This configuration may provide that the autonomous machine that at that moment (e.g., in that scenario) is in the best condition to carry out a task executes that task, e.g. the autonomous machine closest to a location associated with the task, the autonomous machine currently free to execute the task, the autonomous machine equipped with an executor designed for the task, and the like. Various aspects may be illustratively related to the concept of "Collaborative Self-Learning Self-Organizing Multi-Functional Autonomous Robots" (Collaborative Self-Learning Self-Organization, CSLSO) that allows the multi-functional robots to automatically (e.g., with self-learning) collaborate effectively by partitioning subtasks in a dynamic environment with minimal human intervention. Illustratively, the proposed approach may provide the capability to enable multifunction robots to arbitrate for and cooperatively execute sub-tasks within a task pipeline. The configuration described herein may provide scalability, reusability, and an agility of robot's operation, in a cost-efficient manner for a total cost of ownership and support. The collaborative task distribution may provide for dynamic scaling up and down of capabilities based on collaborative environment needs. In addition, the dynamic feedback-based arbitration control may provide for fast adaption to environmental changes.

In the following, two arbitration modes are described, namely a centralized arbitration mode (see, for example, FIG. 7, FIG. 8, and FIG. 11) and a distributed arbitration mode (see, for example, FIG. 5, FIG. 9, and FIG. 10). In the centralized arbitration mode, the task assignment may include arbitration to select a "leader robot" that assigns subtasks. In the distributed arbitration mode, the task assignment may include arbitration to individually select and collaboratively optimize the task assignment to the robot best capable of executing the mission policy and objectives and to dynamically manage subtask exchanges as the situation varies. It is understood that aspects described in relation to the centralized arbitration mode may apply to the distributed arbitration mode, and vice versa. In some aspects, the autonomous machines may dynamically switch from the centralized arbitration mode to the distributed arbitration mode, or vice versa, based on the situation (e.g., operating environment, robot capability failure, and the like).

Figure 6:
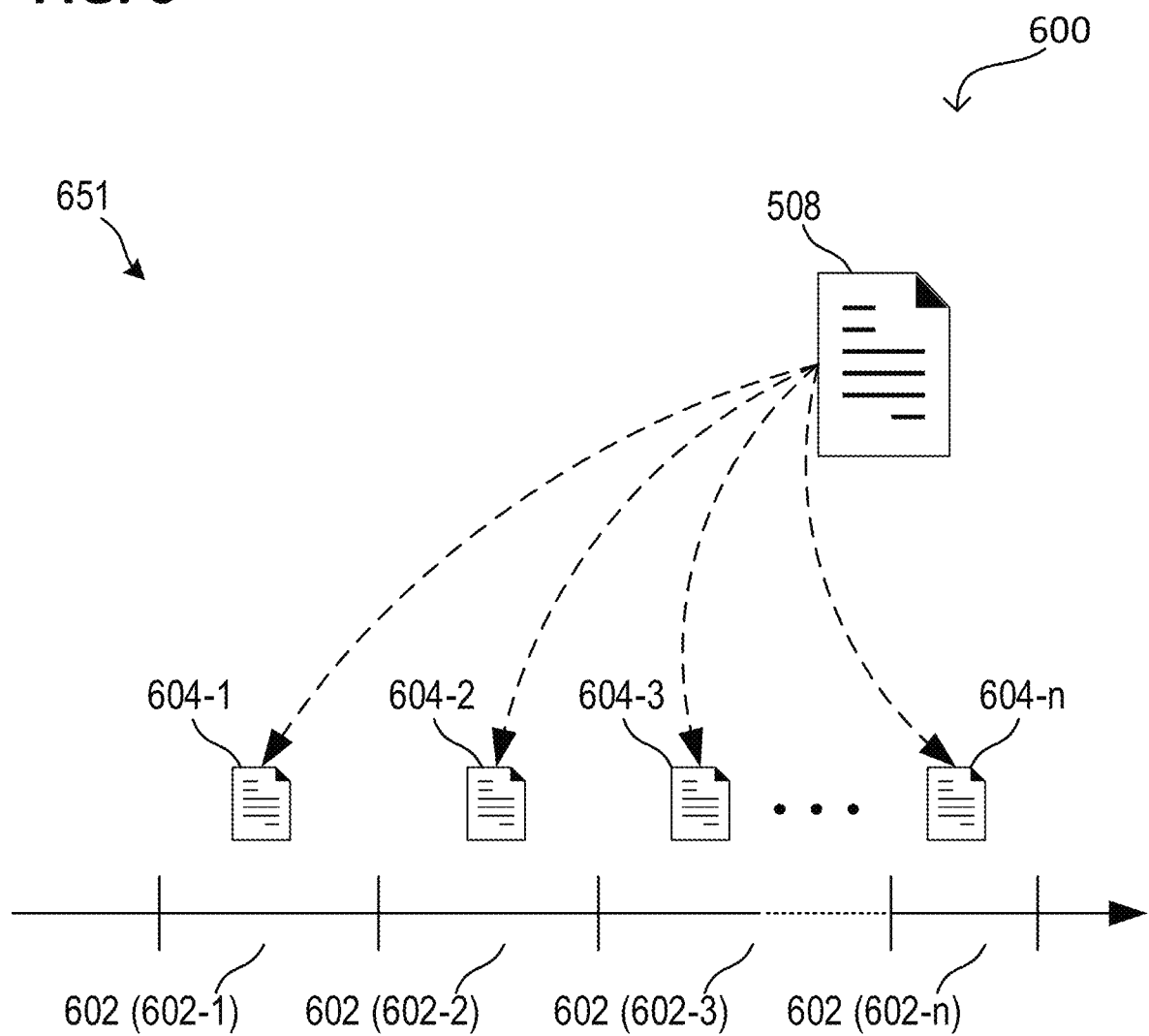
FIG. 6 shows a method in accordance with various aspects of the present disclosure in a schematic diagram.

FIG. 6 shows an example of an autonomous machine 150 in accordance with various aspects 100 of the present disclosure. In some aspects, the machine 150 may include one or more processors 102; one or more sensors 104; one or more effectors 114; one or more kinetic chains 116 (e.g., holding an effector); one or more propulsion devices 118; and/or one or more communication devices 120.

A sensor (also referred to as detector) may be understood as a transducer that is configured to qualitatively or quantitatively sense a property of its environment (also referred to as environmental property) corresponding to the sensor type, e.g., a geometric, kinematic, mechanical, radiometric (e.g., photometric), thermodynamically, electrical and/or chemical property. The sensed quantity is the physical quantity, to which a sensing process using the sensor is directed. Depending on the complexity of the sensor's environment to be sensed, the sensor may be configured to distinguish only between two states of the sensed quantity or to distinguish between more than two states of the sensed quantity. A sensor may be part of a specific processing chain (also referred to as sensing chain), which includes a corresponding infrastructure (e.g., including processor, storage medium and/or bus system or the like). The sensing chain may be configured to operate the corresponding sensor (e.g., water sensor, pressure sensor and/or actuation sensor), to process its sensed quantity as input and to provide a target information as output, which represents the input. According to various aspects, the one or more processors 102 (e.g., being components of a controller) may be configured to implement at least a part of the sensing chain. It is noted that the sensing chain may optionally include (e.g., wireless and/or wired) data exchange, e.g., between various nodes of a network based sensing chain. For example, the sensing chain may be configured to output the sensing result via an electrical signal (also referred to as sensor signal) or communicate the sensing result (e.g., wirelessly and/or via wire) to another component of the sensing chain or to a further communication device (e.g., of a further autonomous machine).

According to various aspects, the sensing result (also referred to as sensor data) may include sensor raw data, quantized information about the sensed property (e.g., one or more values of the sensed property), or a result of processing the information about the sensed property and/or the sensor raw data. For example, the result of an image acquisition as exemplarily sensing process, may include pixel raw data, the image data based on the raw data, the result of an object recognition based on the image data, a spectral composition, a light intensity value, a distance determined based on the image data, etc. The result of the sensing process may include various types of information about an environment of the sensor, which are based on the sensing process that the sensor may perform. According to various aspects, the result of the sensing process may include information about one or more logic, geometric, kinematic, mechanical, radiometric (e.g., photometric), thermodynamically, electrical and/or chemical properties of the environment of the sensor, which are determined based on the sensing process that the sensor performs. Analogously, the type of information may be a logic type, geometric type, kinematic type, mechanical type, radiometric type (e.g., photometric type), thermodynamic type, electric type and/or chemical type.

According to various aspects, the sensing chain (e.g., the one or more processors 102) may be configured to obtain the same sensing result by sensing various environmental properties and/or various sensors may be configured to obtain the same sensing result. For example, the sensing chain (e.g., the one or more processors 102) may be configured to determine a distance of the autonomous machine from an object based on a radar sensor, a LIDAR sensor, or also by processing image data from a camera, e.g., stereographic image data. For example, the sensing chain (e.g., the one or more processors 102) may be configured to determine a temperature based on a resistive temperature sensor or based on a radiometric sensor, e.g., based on a spectral composition that the radiometric sensor sensed.

Generally, each sensor 104 may be configured to sense an actual condition (also referred to as actual state), e.g., the condition at the point of time of the sensing process. Examples of the one or more sensors 104 may be configured to sense the actual condition of the machine 150 (also referred to as operational condition), wherein other examples of the one or more sensors 104 may be configured to sense the actual condition of the environment of the machine 150 (also referred to as environmental condition), e.g., to which the one or more sensors 104 are exposed. Examples of sensing the actual condition of the machine 150 may include: sensing the temperature of the machine 150, sensing the position of an effector, sensing the position of one or more nodes of the kinetic chain 116, sensing the position and/or orientation of the machine 150, sensing the speed of the machine, sensing an operation and/or status of the effector, e.g., sensing a force that the effector may generate, sensing a fluid flow that the effector may generate, generating an electrical power output that the effector may generate. Examples of sensing the environmental condition of the machine 150 may include: sensing an object in the vicinity of the machine 150, e.g., one or more properties of the object; sensing a progress of the task performance; sensing radiation in the vicinity of the machine 150, e.g., electromagnetic radiation or particle radiation; sensing sound/acoustics. Examples of the object may include: the workpiece that machine 150 may process, a human, another machine; a fluid, a gas, a solid. Examples of the properties of the object may include: a distance of the object from the machine; a position of the object; a temperature of the object; a texture of the object; a chemical composition of the object; a movement of the object; etc.

Examples of the one or more sensors 104 include one or more optoelectronic sensors 105 (e.g., providing one or more image acquisition devices), one or more position sensors 106, one or more speed sensors, one or more distance sensors 108, e.g., one or more radar sensors and/or one or more LIDAR sensors, one or more temperature sensors 110, one or more force sensors 112. Examples of the one or more propulsion devices 118 may include one or more ground propulsion devices 118, one or more water propulsion devices 118 and/or one or more air propulsion devices 118. Exemplary components of a propulsion device 118 may include one or more motors; one or more rollers; one or more tires; one or more continuous tracks; one or more propellers; and the like. Exemplary components of a communication device 120 may include one or more (e.g., wireless and/or wired) transceivers 208, 210, 212; one or more antennas (also referred to as antenna system); one or more amplifiers, one or more filters, one or more modulators, one or more demodulators, one or more baseband-processors, one or more signal processors, one or more memories.

Optionally, one or more components of the autonomous machine 150 may be configured exchangeable (also referred to as exchangeable components). The autonomous machine may be configured to unmount an exchangeable component and mount a further exchangeable component in place of the unmounted component (also referred to as self-change process). For example, at least one effector of the autonomous machine 150 may be configured to as exchangeable component. In this case, the kinetic chain 116 holding the effector may be configured to release (e.g., unmount) the effector and mount another effector (also referred to as change tools).

As outlined below in more detail, the one or more processors 102 may be configured to generate one or more messages in accordance with a (e.g., wireless and/or wired) communication protocol and provide the generated one or more messages to the one or more communication devices 120. The one or more communication devices 120 may be configured to send the one or more messages in accordance with a (e.g., wireless and/or wired) communication protocol. Analogously, the one or more communication devices 120 may be configured to receive one or more messages in accordance with a (e.g., wireless and/or wired) communication protocol and provide the received one or more messages to the one or more processors 102. The one or more processors 102 may be configured to process the one or more messages.

Figure 2:
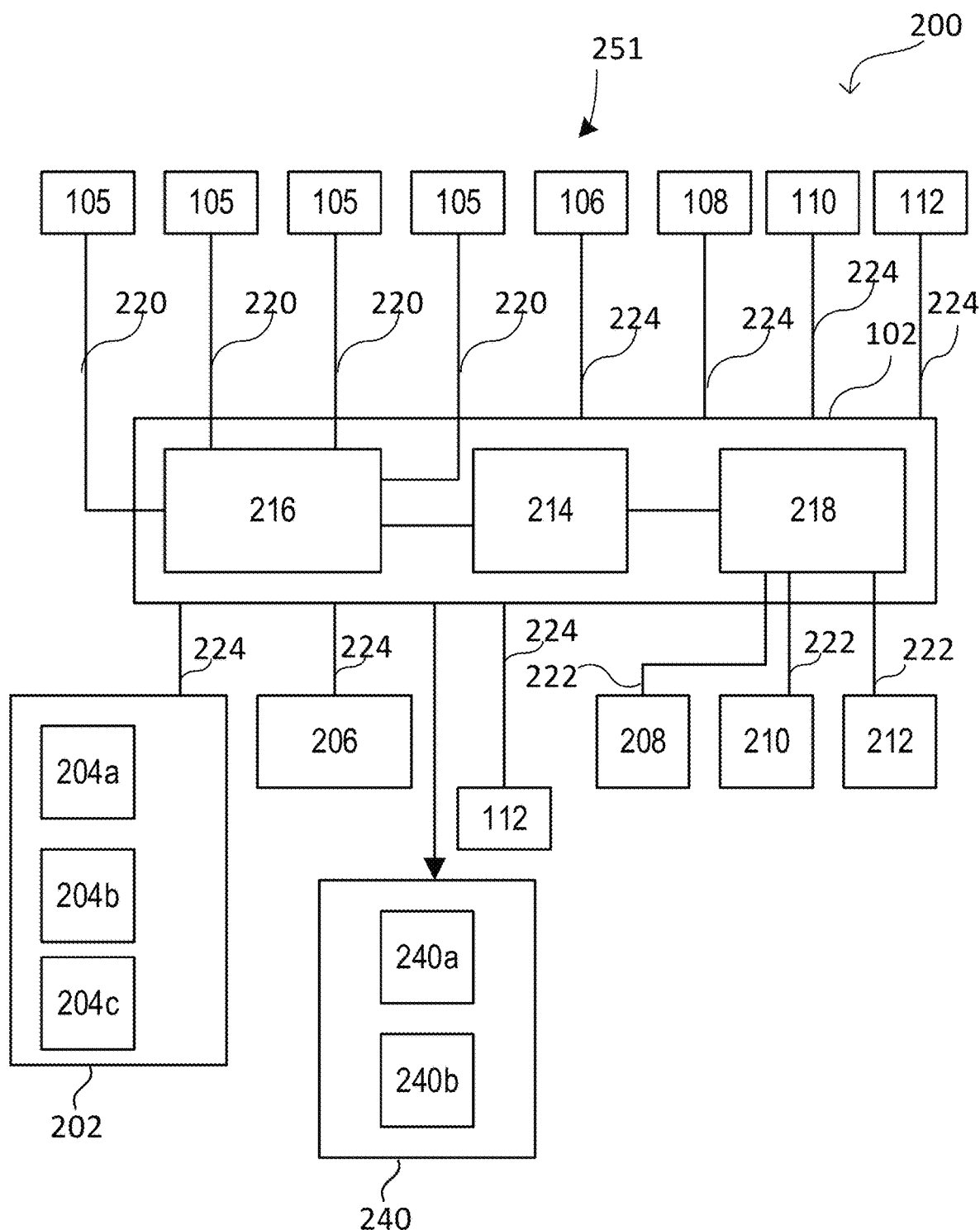
FIG. 2 shows various exemplary electronic components of a control system of the machine in accordance with various aspects of the present disclosure.
Figure 3:
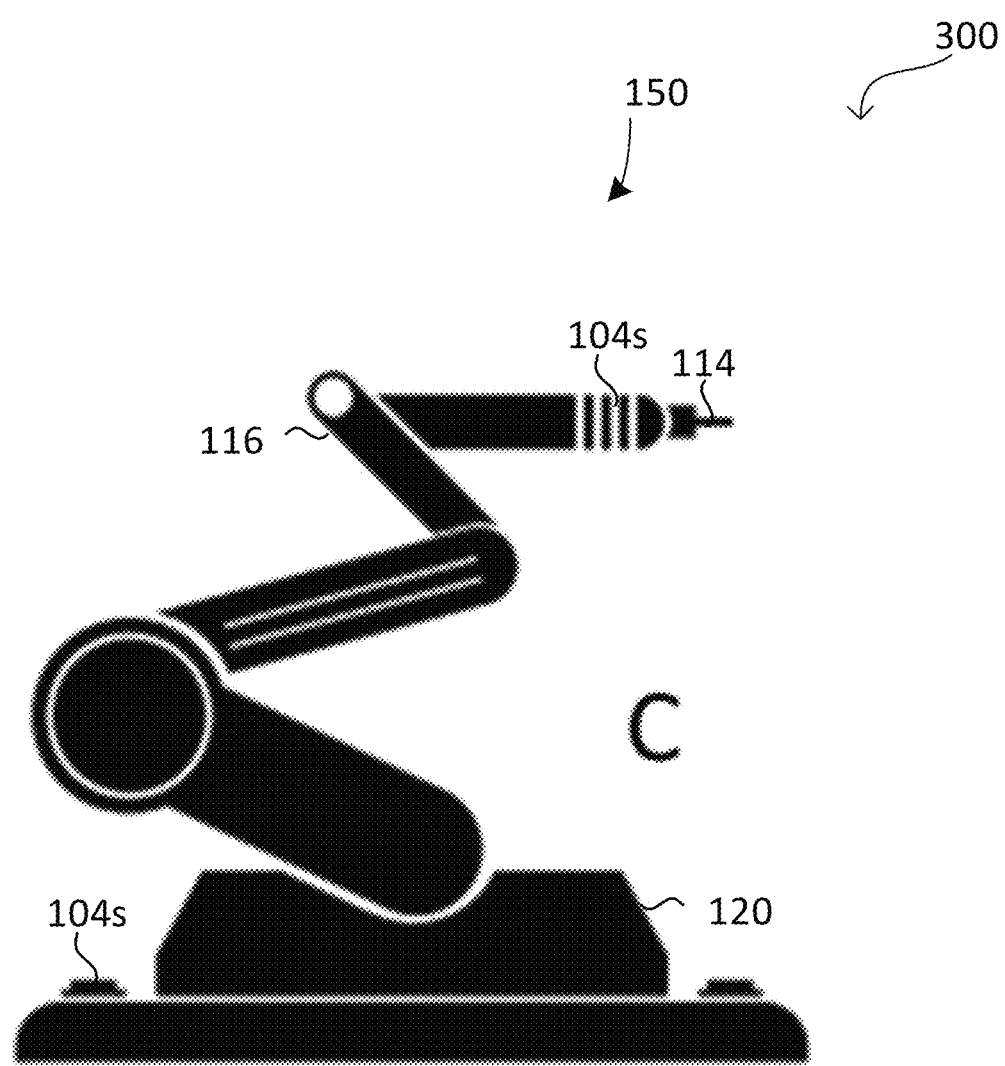
FIG. 3 shows an example of a machine in accordance with various aspects of the present disclosure.
Figure 4:
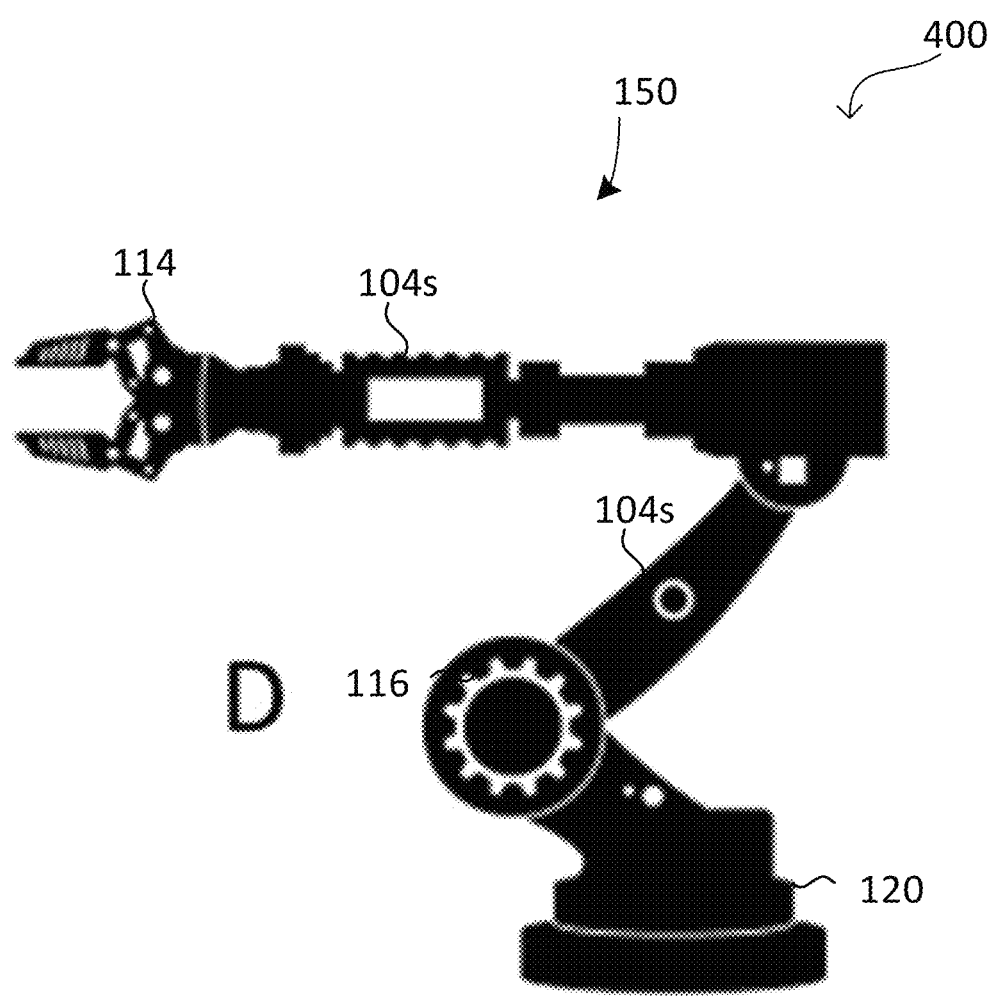
FIG. 4 shows an example of a machine in accordance with various aspects of the present disclosure.

In some aspects, the machine 150 may include a control system 251 (as described with respect to FIG. 2 below). It is appreciated that machine 150 and control system 251 are exemplary in nature and may thus be simplified for explanatory purposes. Locations of elements and relational distances (as discussed above, the figures are not to scale) are provided as examples and are not limited thereto. The control system 251 may include various components depending on the requirements of a particular implementation.

Figure 7:
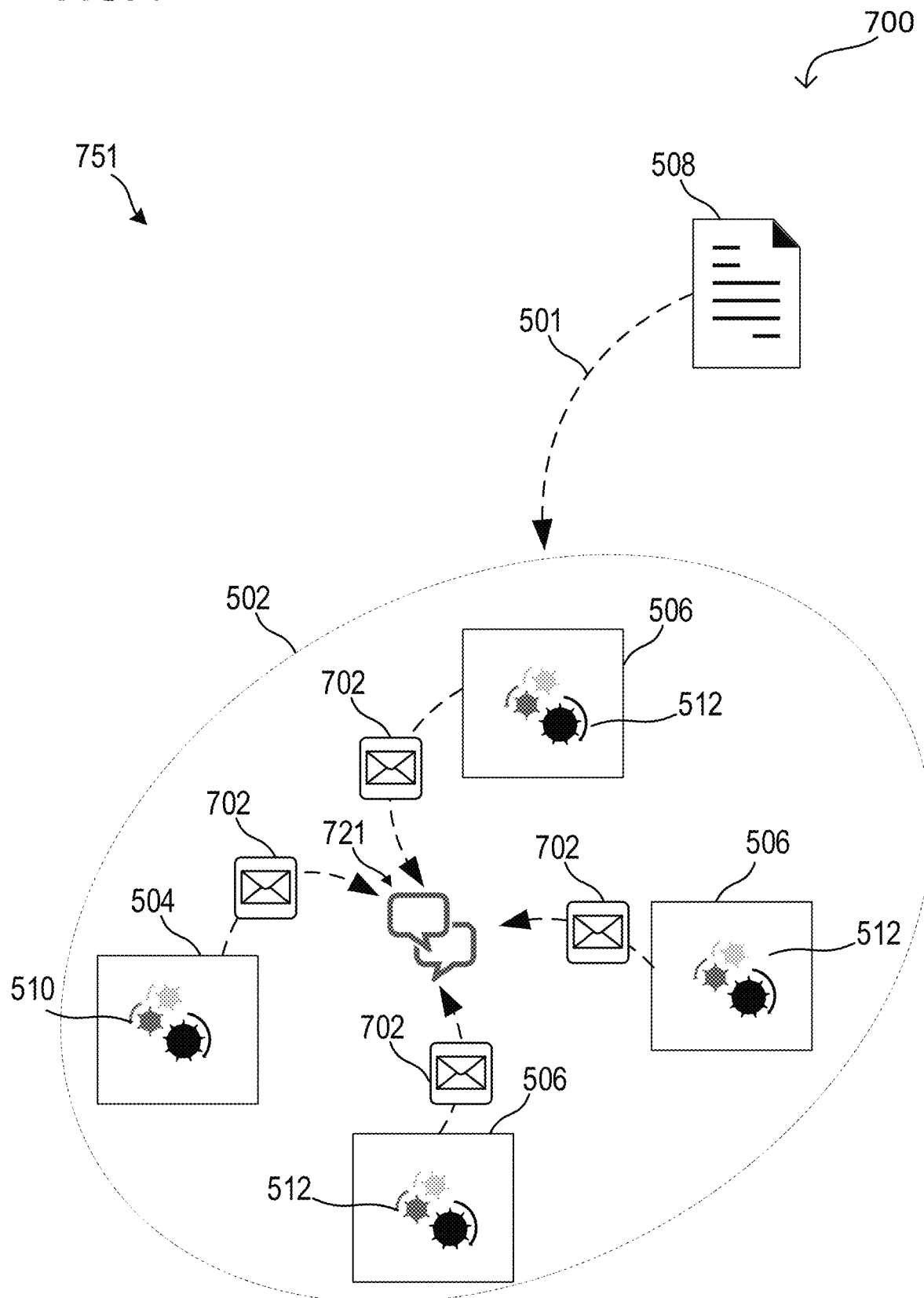
FIG. 7 shows a method in accordance with various aspects of the present disclosure in a schematic diagram.

FIG. 7 shows various exemplary electronic components of a machine, namely control system 751, in accordance with various aspects 200 of the present disclosure. In some aspects, the control system 251 may include one or more processors 102, one or more image acquisition devices 105 (e.g., one or more cameras), one or more position sensors 106 (e.g., a Global Navigation Satellite System (GNSS), a Global Positioning System (GPS), among others) one or more distance sensors 108, e.g., one or more radar sensors and/or one or more LIDAR sensors, one or more temperature sensors 110, one or more force sensors 112. According to at least one aspect, control system 251 may further include one or more memories 202, one or more map databases 204a, one or more mission databases 204b, one or more models 204c, one or more input/output interfaces 206 (e.g., user interfaces), and/or one or more (e.g., wireless and/or wired) transceivers 208, 210, 212. Exemplary components of the one or more input/output interfaces 206 include one or more displays, one or more touch screens, one or more microphones, one or more loudspeakers, one or more buttons and/or switches, etc.

The (e.g., wireless and/or wired) transceivers 208, 210, 212 may, in some aspects, be configured according to the same, different, or any combination thereof radio communication protocols or standards. By way of example, a (e.g., wireless and/or wired) transceiver (e.g., a first wireless transceiver 208) may be configured in accordance with a Short Range mobile radio communication standard (e.g., Bluetooth, Zigbee, among others). As another example, a (e.g., wireless and/or wired) transceiver (e.g., a second wireless transceiver 210) may be configured in accordance with a Medium or Wide Range mobile radio communication standard (e.g., 3G (e.g., Universal Mobile Telecommunications System—UMTS), 4G (e.g., Long Term Evolution—LTE), and/or 5G mobile radio communication standard in accordance with corresponding 3GPP (3$^{rd}$ Generation Partnership Project) standards, among others). As a further example, a (e.g., wireless and/or wired) transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more (e.g., wireless and/or wired) transceivers 208, 210, 212 may be configured to transmit signals via the antenna system over an air interface.

In some aspects, the one or more processors 102 may include an application processor 214, an image processor 216, a communication processor 218, a signal processor, and/or any other suitable processing device. Image acquisition device(s) 105 may include any number of image acquisition devices and components depending on the requirements of a particular application. Image acquisition devices 105 may include one or more image capture devices, e.g., cameras, CCDs (charge coupling devices, or any other type of image sensor).

In at least one aspect, the control system 251 may also include one or more data interfaces communicatively connecting the one or more processors 102 to other components of the control system 251. For example, one or more the data interfaces may be configured to exchange data in accordance with a fieldbus communication protocol or another in-machine communication protocol. For example, the one or more data interfaces may include a first data interface, e.g., including any wired and/or (e.g., wireless and/or wired) first link 220 or first links 220 configured to transmit image data that the one or more image acquisition devices 105 acquire to the one or more processors 102 (e.g., to the image processor 216). For example, the one or more data interfaces may include a second data interface, e.g., including any wired and/or (e.g., wireless and/or wired) second link 222 or second links 222 configured to transmit radio transmitted data that the (e.g., wireless and/or wired) transceivers 208, 210, 212 may acquire to the one or more processors 102, e.g., to the communication processor 218. For example, the one or more data interfaces may include a third data interface 224, e.g., including any wired and/or (e.g., wireless and/or wired) third link 224 or third links 224, coupled to the one or more position sensor 106 and/or to the one or more distance sensors 108 and/or to the one or more temperature sensors 110 and/or to the one or more force sensors 112.

Such data transmissions (e.g., exchange) may also include communications (e.g., one-way or two-way) between the machine 150 and one or more other (target) machines in an environment of the machine 150 (e.g., to facilitate coordination of the task performance by, e.g., including the navigation of, the machine 150 in view of or together with other (e.g., target) machines in the environment of the machine 150), or even a broadcast transmission to unspecified recipients in a vicinity of the transmitting machine 150.

One or more of the transceivers 208, 210, 212 may be configured to implement the group communication protocol (e.g., including a data exchange protocol, e.g., a wireless data exchange protocol and/or a wired data exchange protocol), and optionally one or more other communication protocols. In some aspects, the group communication protocol may include a proprietary (e.g., wireless and/or wired) communication protocol or may be a proprietary (e.g., wireless and/or wired) communication protocol. In some aspects, the group communication protocol may be an application layer protocol, e.g., defining the format, syntax, and/or semantics of the load part of a message generated in accordance with a (e.g., wireless and/or wired) communication protocol.

Each processor 214, 216, 218 of the one or more processors 102 may include various types of hardware-based processing devices. Exemplary components of each processor 214, 216, 218 may include: a microprocessor, pre-processors (such as an image pre-processor), graphics processors, a central processing unit (CPU), support circuits, digital signal processors, integrated circuits, memory, or any other types of devices suitable for running applications and for sensor data processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when a processor (e.g., the one or more processors 102) executes, controls the operation of the system, e.g., of the control system 251. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the control system 251 may further include components such as a speed sensor (e.g., a speedometer) for measuring a speed of the machine 150. The control system may also include one or more accelerometers (either single axis or multiaxis) (not shown) for measuring accelerations of the machine 150 along one or more axes. The control system 251 may further include additional sensors or different sensor types such as an ultrasonic sensor, a thermal sensor, one or more radar sensors 110, one or more LIDAR sensors 112 (which may be integrated in the head lamps of the machine 150), and the like.

The one or more memories 202 may store data, e.g., in a database or in any different format. The one or more processors 102 may be configured to process sensory information (also referred to as sensor data), such as images, radar signals, depth information from LIDAR, temperature values or stereo processing of two or more images) of the environment of the machine 150 together with position information, such as a GPS coordinate, a machine's ego-motion, etc., to determine a current location of the machine 150 relative to the known landmarks, and refine the determination of the machine's location. Certain aspects of this technology may be included in a localization technology such as a mapping and routing model.

The map database 204 may include any type of database storing (digital) map data for the machine 150, e.g., for the control system 251. The map database 204 may include data relating to the position, in a reference coordinate system, of various (e.g., outdoor or indoor) items, including roads, buildings, walls, topographic features (e.g., stairs), geographic features, rooms, points of interest, spatial information of a task, docks, etc. In some aspects, a processor of the one or more processors 102 may download (e.g., some or all) information of the map database 204 over a wired or wireless data connection to a communication network (e.g., over a cellular network and/or the Internet, etc.). In some aspects, a processor of the one or more processors 102 may be configured to determine, e.g., form and/or update, (e.g., some or all) information of the map database 204, e.g., based on sensing the environmental condition by the one or more sensors 104. In some aspects, the map database 204 may store a sparse data model including polynomial representations of the environment of the machine 150.

In some aspects, the control system 251 may include a mission database. Exemplary components of the mission database may include mission data, a task list, a task status, a task allocation, achievement parameters, target results, etc. Illustratively, the mission database may provide and/or store information about a mission of the team, to which the machine 150 is affiliated. Some information of the mission database (e.g., some mission data) may be provided to the machine 150, e.g., one or more other members of the team and/or a central mission controlling authority may provide the information of the mission database. The machine 150 may provide some information of the mission database (e.g., some mission data), e.g., to one or more other members of the team and/or to a central mission controlling authority. The machine 150 may update and/or form some information of the mission database (e.g., some mission data), e.g., in accordance with a status of the mission and/or based on a sensing result of the machine 150.

Furthermore, the control system 251 may include a task performance model 204b, e.g., an automated system may implement the task performance model 204b. By way of example, the control system 251 may include (e.g., as part of the task performance model) a computer implementation of a formal model of the machine or its environment. By way of example, the control system 251 may include (e.g., as part of the task performance model) a safety performance model, a task interpretation model and/or a machine control model. A task performance model may be or include a mathematical model formalizing an interpretation of applicable task performance policies, safety policies, operation policies, mission data, etc., e.g., being applicable to autonomous machines. It is noted that one or more of the detailed components of the task performance model may be implemented monolithically or separately from each other, e.g., by separate applications that the one or more processors may execute.

For example, the safety performance model may be configured to achieve, e.g., three goals: first, the interpretation of safety policies should be sound in the sense that it complies with how humans interpret the safety policies; second, the interpretation should lead to a useful task performance, meaning it will lead to an agile task performance rather than an overly-defensive task performance which inevitably would confuse other agents (e.g., humans and/or machines) and will obstruct accomplishing the mission and in turn limit the scalability of system deployment; and third, the interpretation should be efficiently verifiable in the sense that it can be rigorously proven that the autonomous machine correctly implements the interpretation of the safety policies. The safety performance model, illustratively, may be or include a mathematical model for safety assurance that enables identification and performance of proper responses to dangerous situations such that self-perpetrated accidents can be avoided.

For example, the task interpretation model may be configured to determine a formal formulation of performance steps the machine may perform, e.g., based on information about one or more tasks of the mission allocated to the machine and/or based on the target performance. The conversion may be configured to lead to an efficient task performance and to a result, which meets the target performance as best as possible, e.g., to accomplish the task.

For example, the machine control model may be configured to determine useful actions that the machine may take leading to a useful task performance, e.g., based on the performance steps and/or the model of the machine and/or its environment. For example, the machine control model may generate the control instructions based on a model of the kinetic chain of the machine, the available effectors of the machine, the reachable position of the machine, etc.

The control system 251 may generate data to control or assist to control the engine control unit (ECU) and/or other components of the machine 150 to directly or indirectly control the driving of the machine 150.

In some aspects, the control system 251 may include a driving device 240 configured to drive one or more actuators of the autonomous machine, e.g., one or more actuators of the kinematic chain of the autonomous machine 150 and/or one or more actuators of the one or more propulsion devices 118. For example, the driving device 240 may include one or more amplifiers 240a and/or one or more energy storages 240b. Examples of energy storages 240b may include any storage capable to storing energy (in a certain form, e.g., such as electrically, magnetically, chemically, and the like) and convert the stored energy in electrical power. Examples of the amplifiers 240a may include any voltage-to-voltage converter providing an operation voltage of the one or more actuators based on the electrical supply power and based on a control signal received from the one or more processors 102.

As described above, the machine 150 may include the control system 251 as also described with reference to FIG. 2.

The machine 150 may include the one or more processors 102 e.g. integrated with or separate from an engine control unit (ECU) of the machine 150.

The control system 251 may in general generate data to control or assist to control the ECU and/or other components of the machine 150 to directly or indirectly control the driving of the machine 150.

Although the following aspects will be described in association with the above detailed models, any other model may be provided in alternative implementations.

Figure 8:
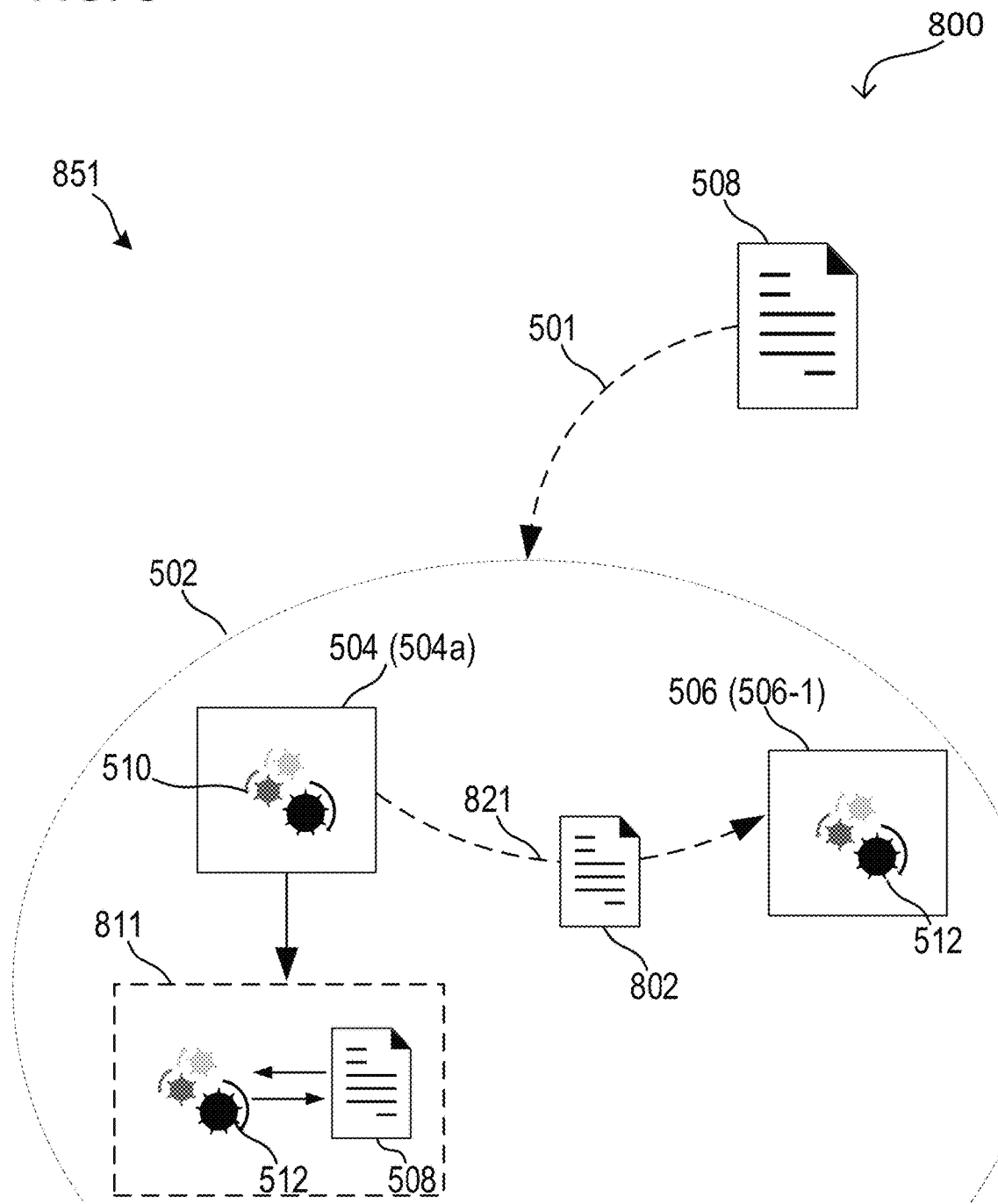
FIG. 8 shows a method in accordance with various aspects of the present disclosure in a schematic diagram.

FIG. 8 shows a further example of machine 150 in accordance with various aspects 800 of the present disclosure, which may be configured in accordance with aspects 100 to 700 and/or in which machine 150 is stationary and includes a welding device as effector 114. As illustrated, the autonomous machine may, at least in some aspects, be a non-humanoid autonomous machine.

Figure 9:
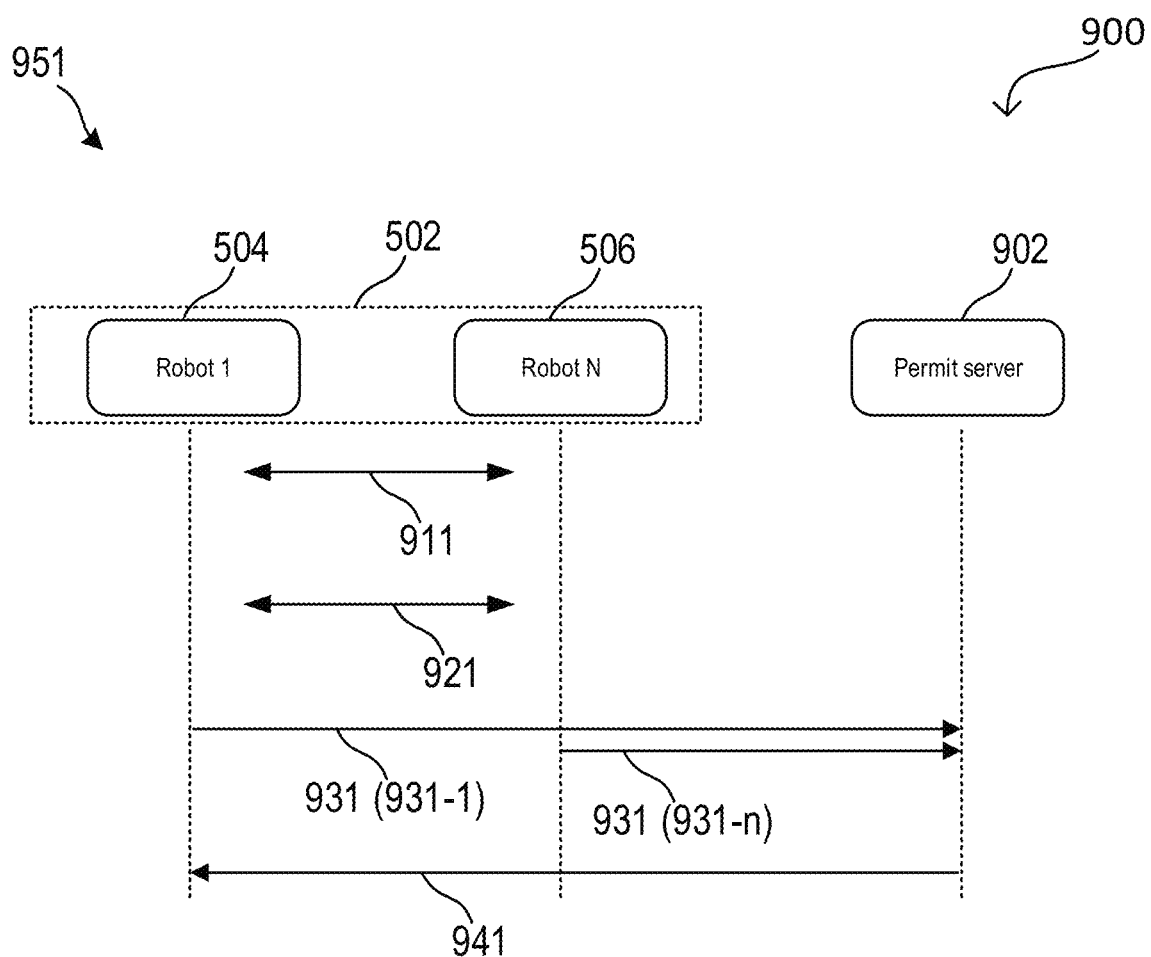
FIG. 9 shows a method in accordance with various aspects of the present disclosure in a schematic diagram.

FIG. 9 shows a further example of machine 150 in accordance with various aspects 900 of the present disclosure, which may be configured in accordance with aspects 100 to 800 and/or in which machine 150 is stationary and includes a grabber device as effector 114. As illustrated, the autonomous machine may, at least in some aspects, be a non-humanoid autonomous machine.

Herein, reference is made to various methods', processing chains, operations, computations, logical relations, models and functions, e.g., with respect to autonomous machines. It can be understood that the references made may be analogously apply to a controller and/or code segments implementing the methods, processing chains, operations, computations, logical relations, models and functions.

Figure 10:
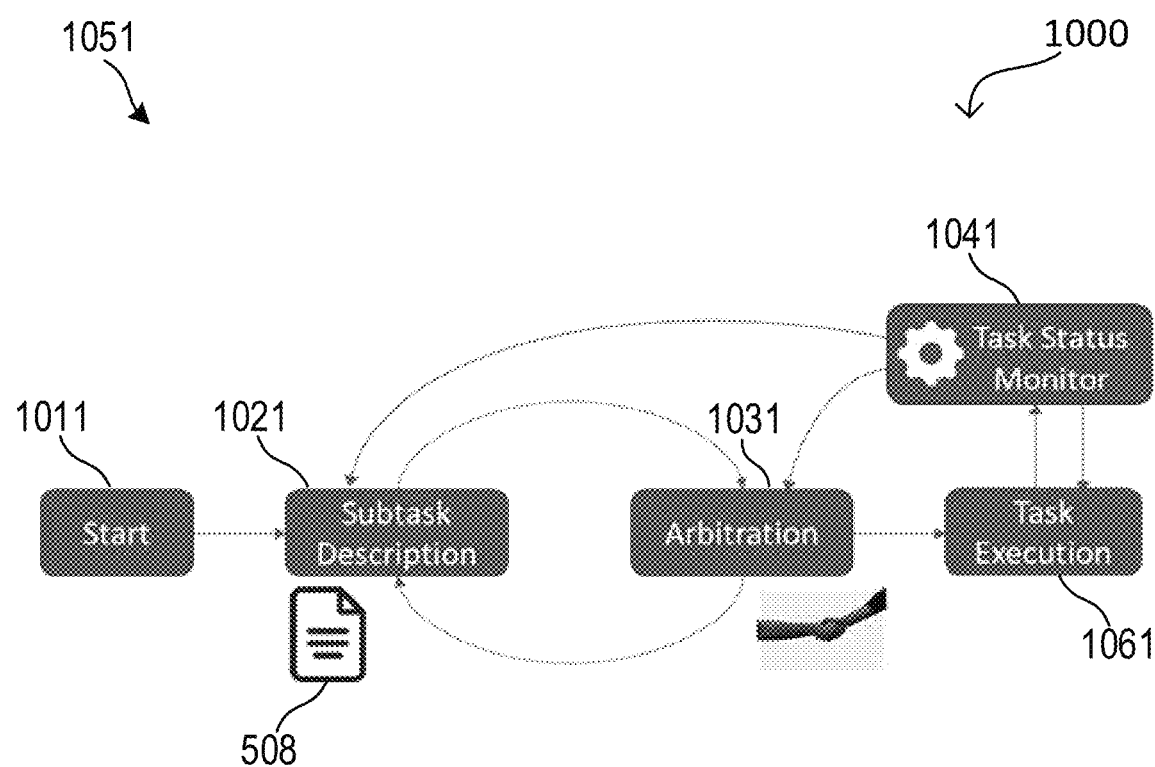
FIG. 10 shows a method in accordance with various aspects of the present disclosure in a schematic diagram.

FIG. 10 shows a method 551 in accordance with various aspects 1000 of the present disclosure, in a schematic communication diagram, which may be configured in accordance with aspects 100 to 900. One or more autonomous machines 150 may implement the method 551, namely a plurality of autonomous machines 502, the one or more processors 102 thereof and/or code segments that the one or more processors 102 execute. In the exemplary configuration shown in FIG. 5, the plurality of autonomous machines 502 may include four autonomous machines, it is however understood that this configuration is only an example, and the plurality of autonomous machines 502 may include any suitable number of autonomous machines (e.g., two, three, four, five, ten, or more than ten autonomous machines, as examples).

For the purpose of explanation of the method 551, the plurality of autonomous machines 502 may include an autonomous machine 504 (hereinafter also referred to as first machine 504) and one or more further autonomous machines 506 (hereinafter also referred to as the other machines 506, or the further machines 506). The method 551 may illustratively be described from the point of view of the first machine 504, which may include a controller including one or more processors 102 configured to carry out the method 551. It is however understood that the other machines 506 may be configured as the first machine 504, e.g. each of the other machines 506 may include a respective controller including one or more processors 102 configured to carry out the method 551. The references made to the first machine 504 may be understood to apply analogously to each of the other machines 506. In some aspects, the method 551 may be understood as a method for allocating a task to an autonomous machine (e.g., to the first machine 504, e.g. to one or more of the autonomous machines of the plurality of autonomous machines 502).

One or more tasks 508 may be available to the plurality of autonomous machines 502. The method 551 may include, in 501, making one or more tasks 508 available to the plurality of autonomous machines 502. In some aspects, making one or more tasks 508 available to the plurality of autonomous machines 502 may be understood as offering or providing the one or more tasks 508 to the plurality of autonomous machines 502. An autonomous machine (e.g., the first machine 504 and/or the other machines 506) may have access to the one or more tasks 508, e.g. an autonomous machine may receive a message indicating that the one or more tasks 508 are available and/or indicating that the autonomous machine should determine whether it can execute at least one task of the one or more tasks 508. In some aspects, a server (e.g., a task server) may make the one or more tasks 508 available to the plurality of autonomous machines 502, as described in further detail below. Illustratively the server may broadcast (e.g., mission/objectives) in all the available channels with offered capabilities. The mission objective may be something in the experience and capabilities of the autonomous machines (e.g., learned and captured in artificial intelligence model). In some aspects, the system (e.g., the task server) may scan for trusted neighbors (illustratively, for the plurality of autonomous machines 502) which are interested in collaborative task management.

The description of the one or more tasks 508 may be as commonly known in the art. The task description may include the standard format for task description including a sub-task enumeration and detailed task steps with an application programming interface (API) for robotic execution systems like a Robotic Operating System (ROS).

The one or more tasks 508 may be associated with a mission. The one or more tasks 508 may be understood as a list of tasks that one or more autonomous machines should carry out to complete the mission (e.g., the one or more tasks 508 may be understood as a list of mission requirements). In some aspects, each task of the one or more tasks 508 may have a respective priority associated therewith (e.g., the task server may be configured to allocate or to assign a respective priority to each task in a mission). The priority associated with a task may be in accordance with the relevance of that task for the mission, e.g. a main or primary task (for example defining the overall goal of the mission) may have a high (or relatively higher) priority, and a side or secondary task (for example associated with an operation not strictly essential to the completion of the mission) may have a low (or relatively lower) priority. In some aspects, the priority associated with a task may define or influence the timing of the execution of the task, as described in further detail below. As an example, in case the goal of the mission is the exploration of an area, a main task may include a movement over the area, and a side task may include the collection of a sample from a certain location in the area. In some aspects, the one or more tasks 508 may be understood as a mission priority table (e.g., as a table including the one or more tasks 508 for completing the mission and the respective priority). In some aspects, the information about the one or more tasks 508 may be understood as mission data.

The method 551 may include, in 511, comparing information about one or more functions 510 of the first machine 504 with information about the one or more tasks 508 available to the plurality of autonomous machines 502. Information about the one or more functions of an autonomous machine (e.g., the information about the one or more functions 510 of the first machine 504) may include at least one of a current operational condition of the autonomous machine (e.g., including a current workload of the autonomous machine), a current location of the autonomous machine, an availability of the autonomous machine, and one or more operational parameters associated with the autonomous machine (e.g., including a residual energy, or a residual battery life of the autonomous machine). The information about one or more functions of an autonomous machine may describe or represent the capabilities of the autonomous machine and the current situation in which the autonomous machine is (e.g., a current task the autonomous machine is executing, an expected time for completion of the current task, etc.). The comparison 511 may provide information about which task(s), if any, of the one or more tasks 508 the first machine 504 may carry out, as described in further detail below.

In some aspects, the comparison 511 may include comparing information about one or more previous tasks (or information about one or more previous missions) with the information about the one or more tasks 508 available to the plurality of autonomous machines 502. A previous task may be understood as a task that an autonomous machine (e.g., the first machine 504 or another machine) executed in relation to a different mission, or more in general as a task that an autonomous machine executed at some point in the past during its life cycle. A previous task may be a task that the first machine 504 executed. Additionally, or alternatively, a previous task may be a task that another machine executed and of which the first machine 504 has knowledge (e.g., the other machine shared information about the previous task with the first machine 504). An autonomous machine (e.g., the first machine 504) may evaluate whether it has (already) experience or past knowledge that may be relevant for fulfilling the one or more tasks 508 of the (new) mission. Illustratively, prior history or learnings from autonomous machines (e.g., drones) based on earlier/similar missions may impact them with respect to selection and tasking. An autonomous machine (e.g., a drone) may use a learning algorithm or heuristics from a prior mission which is applicable to the current mission. As an example, the information about the previous mission may be familiarity with terrain, landmarks and structures, weather, zones of potential danger, optimum routes for approach/departure, and the like. Some of this information may include directly collected knowledge from its own task and mission experience and some may include information from other drones/machines and events, e.g. drones encountering issues when using a stairwell compared to exiting a building to change floors during a fire.

In some aspects, the method 551 may include determining the information about one or more functions 510 of the first machine 504 based on a permit associated with the first machine 504. An autonomous machine (e.g., the first machine 504, and/or the other machines 506) may be configured to obtain (e.g., from a server, such as a permit server) a permit describing the capabilities and the authorizations associated with the autonomous machine (illustratively, what the autonomous machine is capable of doing and what the autonomous machine may be authorized to do). An autonomous robot may receive (e.g., at manufacturing time or run-time) a respective "permit" to distinguish device(s) capability and role. Illustratively, the permit may define the scope of the functionality of a robot, and may change during the robot's life cycle (e.g., an authorization may be no longer valid, a new authorization may be valid, etc.). The method 551 may include obtaining (e.g., from the permit server) the permit associated with the first machine 504, and determining the information about the one or more functions 510 of the first machine 504 based on the permit.

The method 551 (e.g., the comparison 511) may include determining whether the first machine 504 is qualified for carrying out at least one task of the one or more tasks 508 (e.g., based on the result of the comparison 511). The method 551 may include, based on the result of the comparison 511, determining whether there is at least one task (e.g., any task) of the one or more tasks 508 that the first machine 504 may be capable of executing. The determination may be based on (in other words, in accordance with) the information about the one or more functions 510 of the first machine 504. In addition, or in alternative, the determination may be based on the information about the one or more previous tasks. Stated in a different fashion, the method 551 may include, based on a current situation of the first machine 504 (and/or on a previous history of task execution), determining whether the first machine 504 may make itself available for the execution of at least one task of the one or more tasks 508. The at least one task may be the task among the one or more tasks 508 that the first machine 504 may execute in a most efficient manner (e.g., in the smallest amount of time, with the smallest energy consumption, with the highest precision, as examples) based on the information about the one or more functions 510 (and/or based on the information about the one or more previous tasks), e.g. with respect to the other machines 506. Illustratively, looking at the mission, each robot may make an individual determination if it is capable for this mission based on the parameters and goals and its availability (not currently in a critical process, as an example).

In some aspects, the comparison 511 may include determining a qualification of the first machine 504 to perform a task of the one or more tasks 508 based on the information about the one or more functions 510 of the first machine 504. Illustratively, the comparison 511 may not only determine whether the first machine 504 is qualified for a certain task, but also how qualified the first machine 504 is for that task. The qualification may be understood, in some aspects, as a score or a ranking indicating a level of suitability of the first machine 504 for carrying out a particular task. In some aspects, the comparison 511 may include determining a qualification table (also referred to herein as robot capabilities table) indicating for each task of the one or more tasks 508 a respective qualification (a respective score) of the first machine 504 for carrying out that task. The method 551 may include determining a qualification associated with a task based on the requirements of the task and on the information about the one or more functions 510 of the first machine 504. In some aspects, the comparison 511 may include determining a qualification of the first machine 504 to perform a task of the one or more tasks 508 based on the information about the one or more previous tasks, e.g. the first machine 504 may determine its suitability for the (new) mission based on knowledge (direct or indirect) about previous missions.

By way of example, the method 551 (e.g., the comparison 511) may include determining a low qualification (e.g., 0 in a range from 0 to 10) in case the first machine 504 is incapable of performing that task (e.g., in case the first machine 504 does not include a suitable executor, in case the first machine 504 will not complete its current operation in time for executing the task, and the like). The method 551 may include determining a relatively low qualification (e.g., between 1 and 3) in case the first machine 504 could perform the task in a sub-optimal manner (e.g., in case the first machine 504 includes an executor not specifically designed for the task, in case the first machine 504 will require a great amount of time for completing the task, and the like). The method 551 may include determining a relatively high qualification (e.g., between 4 and 7) in case the first machine 504 could perform the task in a proper (although not still optimal) manner (e.g., in case the first machine 504 includes an executor specifically designed for the task but the executor is not perfectly calibrated, in case the first machine 504 is relatively far away from the location of the task, and the like). The method 551 may include determining a high qualification (e.g., greater than 8, e.g. 10) in case the first machine 504 could perform the task in an optimal manner (e.g., in case the first machine 504 includes an executor specifically designed for the task and properly calibrated, in case the first machine 504 is immediately available, and the like). The qualification may be a combination of the various aspects related to the one or more functions 510 of the first machine 504 to provide the final score associated with a task.

In some aspects, the method 551 (e.g., the comparison 511) may include comparing a rating attributed to each of the one or more functions 510 of the first machine 504 with the information about the one or more tasks 508. Illustratively, an autonomous machine (e.g., the first machine 504) may have a knowledge about its capabilities, e.g. a knowledge about what the autonomous machine may be capable of doing and at what level of efficiency (e.g., at what level of precision, at what speed, etc.) As an example, a rating may include a relatively high rating for "tightening a screw", in case the autonomous machine includes a screwdriver, and may include a relatively low rating for "making a hole", which may still be possible by using the screwdriver but in a less efficient manner. The comparison of the rating attributed to each of the one or more functions 510 of the first machine 504 with the information about the one or more tasks 508 may provide determining for which task (or tasks) the first machine 504 is (most) qualified.

The method 551 (e.g., the comparison 511) may include determining which tasks to vote for (for allocation to the first machine 504) based on the result of the comparison, e.g. based on the qualification associated with each task. Illustratively, the result of the comparison 511 may include a candidature of the first machine 504 for a task of the one or more tasks 508. A qualification of the first machine 504 to perform a certain task may be understood as a strength of the candidature of the first machine 504 for that task. Based on the result of the comparison 511 the first machine 504 may determine for which task or tasks it should advertise its availability.

The method 551 may include, in 521, negotiating, with the other machines 506 and based on the result of the comparison 511, which task of the one or more tasks 508 is allocated to the first machine 504 (illustratively, which task (or tasks) the first machine 504 will carry out). The negotiation 521 may be understood as a voting among the plurality of autonomous machines 502 in which each autonomous machine indicates which task (or tasks) the autonomous machine may be capable of carrying out (and with which score), and in which the autonomous machines decide together which among them is the autonomous machine most qualified for each task.

For the negotiation 521, the plurality of autonomous machines 502 may communicate with one another in accordance with a wireless communication protocol (e.g., via the respective communication devices 120), e.g. via one or more communication interfaces, as described above. In some aspects, the first machine 504 (e.g., the one or more processors 102 thereof) may be configured to negotiate a mission group with the other machines 506 in accordance with a group communication protocol via one or more communication interfaces.

The negotiation 521 may include indicating (via a message) to the other machines 506 which task (or tasks, if any) of the one or more tasks 508 the first machine 504 is (most) qualified to execute, based on the result of the comparison 511. By way of illustration, the negotiation 521 may include advertising what skills the first machine 504 has, which may contribute to completing the one or more tasks 508.

Negotiating 521 with the other machines 506 may be understood, in some aspects, as arbitrating or discussing with the other machines 506 to distribute the one or more tasks 508 available to the plurality of autonomous machines 502. In some aspects, the method 551 (e.g., the negotiation 521) may include generating a message (e.g., in accordance with a wireless communication protocol) to each of the other machines 506, the message including (or being based on) a result of the comparison 511 (e.g., the message may include the qualification table associated with the first machine 504, e.g. the candidature of the first machine 504 for the one or more tasks 508).

The negotiation 521 may include, for each task of the one or more tasks 508, determining which autonomous machine of the plurality of autonomous machines 502 is most qualified for carrying out that task. The negotiation 521 may include assigning a task to an autonomous machine when (in other words, in case) the qualification of the autonomous machine to perform that task fulfills a criterion, as described in further detail below (e.g., the negotiation 521 may include assigning the first machine 504 to a (first) task, when the qualification of the first machine 504 to perform that (first) task fulfills a criterion).

An autonomous robot may broadcast its execution capacity (capabilities, telemetry, the snapshot of power/performance profile, etc.). Key is the comparison of robot capabilities tables against mission priority tables—each robot may evaluate its top capabilities against the mission requirements and recommend/assign itself the most appropriate task and/or one it is optimally suited to perform. As an example, given a search over a terrain, the fastest drone/robot may elect to scout the furthest points due to time constraint policy in the mission requirements. This form of comparative ranking among the robots would result in the best robot being assigned to key tasks ranked from top to bottom.

From the point of view of the first machine 504, the negotiation 521 may include, for each task of the one or more tasks 508, determining whether another autonomous machine of the other machines 506 is more qualified than the first machine 504 for carrying out the task, based on the result of the comparison 511. Illustratively the method 551 (e.g., the negotiation 521) may include, for each task of the one or more tasks 508, determining which task of the one or more tasks 508 to allocate to the other machines 506. The first machine 504 may determine that it is not qualified for carrying out a task, e.g. in case it does not include a proper executor, in case it is located too far away from a location associated with the task, etc., and may determine that another autonomous machine 506 is more suitable for that task (and accept to allocate the task to that other autonomous machine 506).

The negotiation 521 may be based on a result of the determination of whether the first machine 504 is qualified for carrying out at least one task of the one or more tasks

508. For each task, the first machine 504 may negotiate whether to allocate that task to the first machine 504 based on how the first machine 504 evaluated its one or more functions 510 in relation to the one or more tasks 508 (e.g., in the comparison 511).

The method 551 (e.g., the negotiation 521) may include (for each task of the one or more tasks 508) allocating the task to the first machine 504 in case the first machine 504 is more qualified than any other autonomous machine 506 of the other machines 506 for carrying out the task (e.g., based on the result of the determination). Illustratively, from the point of view of the first machine 504, the method 551 may include negotiating to allocate a task to the first machine 504 based on whether the other machines 506 are less qualified for that task (e.g., also based on the respective determination that the other machines 506 carry out). The method 551 (e.g., the negotiation 521) may include, for each task, comparing the respective qualification of the first machine 504 and of the other machines 506 to perform that task, and allocating the task to the first machine 504 in case the qualification of the first machine 504 is greater than the qualification of each autonomous machine of the other machines 506 to perform that task. The criterion associated with the qualification of the first machine 504 for a task may be fulfilled when the qualification of the first machine 504 to perform a (first) task is greater than the qualification of each autonomous machine of the other machines 506 to perform that (first) task.

The method 551 (e.g., the negotiation 521) may include (for each task of the one or more tasks 508) allocating the task to another autonomous machine 506 of the other machines 506 in case the other autonomous machine 506 is more qualified than the first machine 504 for carrying out the task. Illustratively, from the point of view of the first machine 504, the method 551 may include negotiating to allocate a task to another autonomous machine 506 based on whether the other autonomous machine 506 is more qualified (or the most qualified among the plurality of autonomous machines 502) for that task (e.g., also based on the respective determination that the other machines 506 carry out). The method 551 (e.g., the negotiation 521) may include, for each task, comparing the respective qualification of the first machine 504 and of the others machines 506 to perform that task, and allocating the task to another autonomous machine 506 in case the qualification of the other autonomous machine 506 is greater than the qualification of the first machine 504 (and of each other of the other machines 506) to perform that task.

In some aspects, the method 551 (e.g., the negotiation 521) may include obtaining (e.g., receiving, or accessing) further information about one or more functions 512 of the other machines 506. As an example, the first machine 504 may obtain the further information about the one or more functions 512 from the other machines 506, e.g., via a message in accordance with a wireless communication protocol. As another example, the first machine 504 may obtain the further information about the one or more functions 512 from a server (e.g., from the task server). As a further example, the first machine 504 may access the further information about the one or more functions 512 in a database storing the information.

The information about the one or more functions 512 of the other machines 506 may include information about at least one of: a respective current operational condition of the other machines 506 (e.g., including a respective workload), a respective current location of the other machines 506, a respective availability of the other machines 506, and respective one or more operational parameters associated with the other autonomous machines 506 (e.g., including a residual energy, or residual battery life).

The negotiation 521 may be further based on the further information about the one or more functions 512 of the other machines 506. The method 551 (e.g., the negotiation 521) may include comparing the further information about the one or more functions 512 of the other machines 506 with the information about the one or more functions 510 of the first machine 504. Additionally, or alternatively, the method 551 (e.g., the negotiation 521) may include comparing the further information about the one or more functions 512 of the other machines 506 with the information about the one or more tasks 508. Illustratively, the negotiation 521 may include assessing whether (and at what level) the other machines 506 are qualified for a task (e.g., for each task) of the one or more tasks 508 in comparison to the qualification of the first machine 504. For each task of the one or more tasks 508, the negotiation 521 may include determining whether another autonomous machine of the other machines 506 is more qualified than the first machine 504 for carrying out the task, based on the further information.

In some aspects, the negotiation 521 may further include sharing with the other machines 506 (e.g., via a message according to a wireless communication protocol) the information about the one or more previous tasks. The first machine 504 may communicate its own information about one or more previous tasks to the other machines 506, and the first machine 504 may receive from the other machines 506 (e.g., from at least one of the other machines 506, or from each of the other machines) the respective information about one or more respective previous tasks. Illustratively, the negotiation 521 may include comparing the respective past experiences of the autonomous machines to allocate the one or more tasks 508, e.g. to the autonomous machine with the most experience for that task (or in analogous tasks).

In some aspects, the method 551 may include carrying out the negotiation 521 in order of priority of the one or more tasks 508, e.g. the negotiation may include allocating first the main or primary task (or tasks), and subsequently the remaining tasks in order of decreasing priority, as an example. In some aspects, the method 551 may include carrying out the negotiation 521 in order of execution time of the one or more tasks, e.g. the negotiation may include allocating first the task (or tasks) requiring the longest execution time, and subsequently the remaining tasks in order of decreasing execution time, as another example.

The method 551 may include carrying out the negotiation 521 until completion of the allocation of the one or more tasks 508 to the plurality of autonomous machines 502. The method 551 may include closing the negotiation 521 when for each task of the one or more tasks 508 the plurality of autonomous machines 502 have allocated (e.g., a minimum of) one autonomous machine of the plurality of autonomous machines 502 to the execution of that task.

The method 551 may illustratively be described as follows. When a mission and its parameters are broadcast to a population of robots (e.g., when the one or more tasks 508 are available to the plurality of autonomous machines 502), those robots may evaluate the mission parameters and objectives against their own availability (e.g., carrying out a respective comparison 511), locality, capabilities and current status starting at the top mission priority and working down. The robot may then broadcast where in the mission line items it can optimally support the objectives (e.g., during the negotiation 521). Robots compare the broadcasts of fellow robots with their own self-evaluation and will overrule if they are superior or decline if they are inferior to the existing "volunteer". This is repeated till all principle mission goals are satisfied which results in an optimal team of robots aligned by task to the mission. By way of illustration, as the robots assign themselves to the mission, the task and objectives list is filled out until a complete "team" of robots has been selected as the best candidates to address the parameters and goals of the stated mission. This aspect of mission parameter-based robotic selection and teaming ensures that the most appropriate robots are selected to a mission's most critical tasks without needing a central robot to make this determination (a centralized task allocation will be described in further detail below, see for example FIG. 7, FIG. 8, and FIG. 11). Incorporation of the mission experience (e.g., the sharing of information about previous tasks) may result in a change in members or a transfer of that information to the team (e.g., to the drone team), for instance, which may improve the mission success and machine survivability (e.g., drone survivability).

In some aspects, the shared results of the respective comparisons, and the information exchange during the negotiation 521 may assist facing unexpected events that may prevent an autonomous machine of the plurality of autonomous machines 502 from carrying out (or completing) a task allocated thereto. Based on the respective capabilities (e.g., on the respective qualification table) the method 551 may include allocating a task to the next qualified (the next most qualified) autonomous machine, in case the autonomous machine originally allocated to the task fails (or at least partially fails) to carry out the task. As described above, each robot may share its capabilities "mask" against the mission tasks and parameters with the others. This may assist in determining the next most capable robot under conditions where a robot is disabled, and in assigning a replacement. There may be a recognized backup robot to the primary which is able to take on an open task.

From the point of view of the first machine 504, the method 551 may include obtaining (e.g., receiving) an indication that a (second) autonomous machine of the other machines 506 at least partially failed to carry out a task of the one or more tasks 508 allocated to the (second) autonomous machine 506. The method 551 may include allocating the task to the first machine 504 (e.g., in case the first machine 504 is the next most qualified autonomous machine for that task). Illustratively, the criterion associated with the qualification of the first machine 504 for a task may be fulfilled when the other (second) autonomous machine of the other machines 506, which has a greater qualification to perform the task, at least partially fails to complete the task.

In some aspects, the method 551 may include obtaining a (new) permit based on the allocated task (or tasks). Upon successful arbitration an autonomous robot may obtain a new permit (illustratively, a license to operate) that defines the role of the robot and assigns task to execute and expiration for task assignment. An autonomous robot may obtain a new permit as a part of collaborative assignment or change role upon expiration of the permit (and then a new negotiation may start). All the contributing nodes may exchange their permits platform credentials (e.g., license) with the remote license server to authenticate themselves.

In some aspects, the method 551 may include a dynamic update of the tasks. As an example, in case of subtask(s) not getting done as expected or subtask(s) skipped due to unavailability of certain capabilities, the plurality of autonomous machines 502 may reschedule (re-allocate) the subtask (s). As a further example, based on the latest situation, the method 551 may include deleting certain subtasks from the list or adding new subtasks to the list or revisiting a sequence of subtasks.

In some aspects, the method 551 may include dynamically scaling up and down of capabilities based on collaborative environment needs. From the point of view of the first machine 504, the method 551 may include determining whether to scale up or down its capabilities based on a current status of the plurality of autonomous machines 502 in relation to the execution of the one or more tasks 508. Illustratively, the method 551 may include scaling up the capabilities in case the plurality of autonomous machines 502 are behind in the execution of the tasks, and scaling down the capabilities (e.g., to save resources) in case the plurality of autonomous machines 502 are already efficiently executing the tasks. The method 551 may include receiving (e.g., from one or more of the other machines 506) information about an execution of a respective task (or respective tasks) allocated thereto, and determining whether to scale up or down (or to leave unaltered) own capabilities based on the received information. Stated in a different fashion, from the point of view of the first machine 504, the method 551 may include receiving information about an execution of a task allocated to another autonomous machine 506 (e.g., via a message according to a wireless communication protocol), and scaling up or down (or leaving unaltered) the capabilities of the first machine 504 based on the received information.

Figure 11:
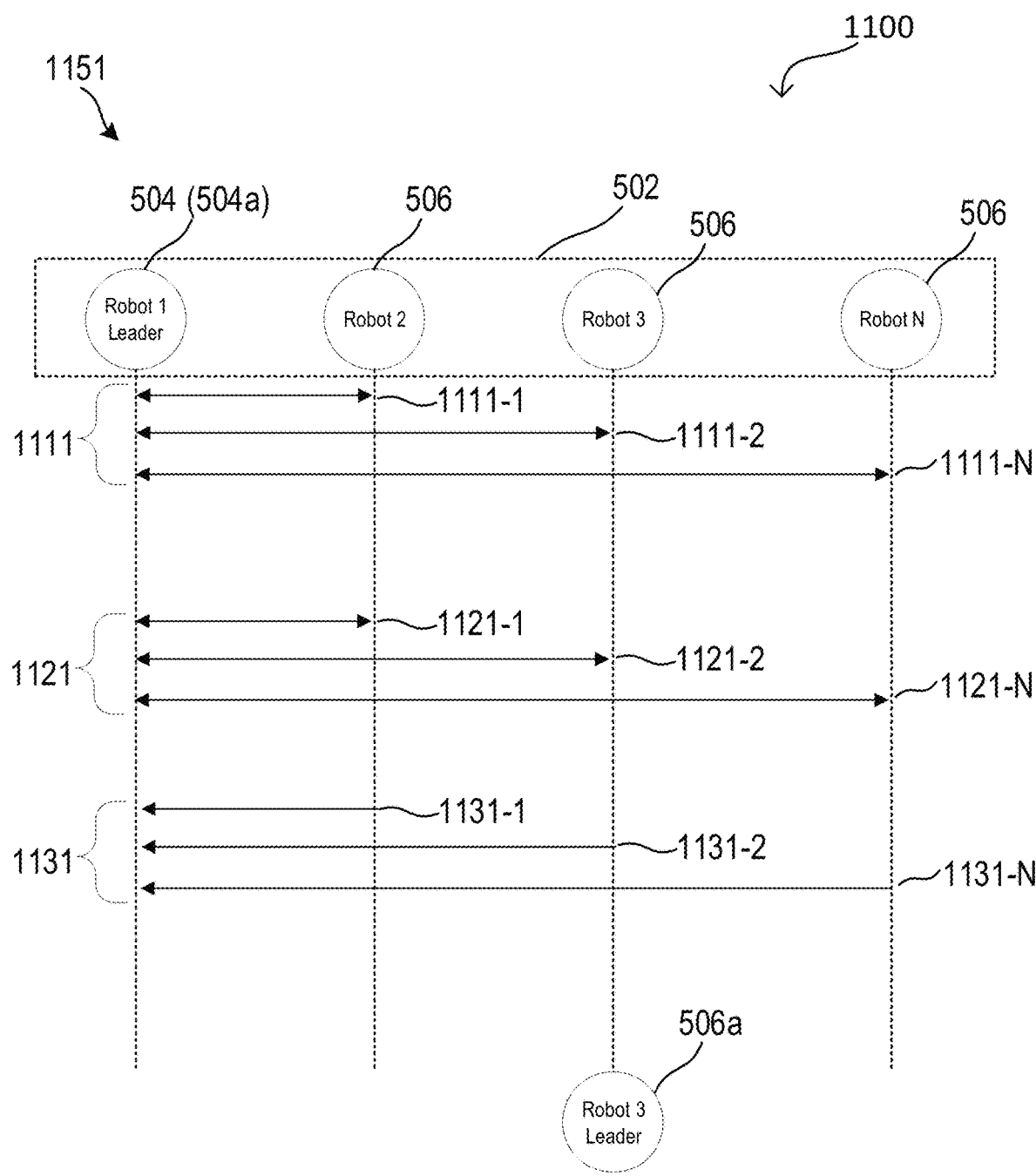
FIG. 11 shows a method in accordance with various aspects of the present disclosure in a schematic diagram.

FIG. 11 shows a method 651 in accordance with various aspects 1100 of the present disclosure, in a schematic communication diagram, which may be configured in accordance with aspects 100 to 1000. One or more autonomous machines 150 may implement the method 651, namely the plurality of autonomous machines 502 (the first machine 504 and the other machines 506), e.g., the one or more processors 102 thereof and/or code segments that the one or more processors 102 execute. In some aspects, the method 651 may be part of the method 551 (e.g., of the negotiation 521). The method 651 may be understood, as a method of executing the one or more tasks 508.

The execution of the one or more tasks 508 may be in accordance with different execution schemes, e.g. sequential (illustrated in FIG. 6), simultaneous (or concurrent, not illustrated), or hybrid (a mix of sequential and simultaneous execution, not illustrated).

According to the sequential execution scheme, the method 651 may include assigning each task of the one or more tasks 508 to a respective time slot 602 (e.g., a first task 604-1 to a first time slot 602-1, a second task 604-2 to a second time slot 602-2, a third task 604-3 to a third time slot 602-3, a n-th task 604-$n$ to a n-th time slot 602-$n$, etc.). The plurality of autonomous machines 502 may define the order in which they will execute the tasks 508 (and, in some aspects, may communicate the order to the task server). In some aspects, the method 651 may include assigning each task of the one or more tasks 508 to a respective time slot 602 based on the respective priority of each task. As an example, the plurality autonomous machines 502 may decide to execute the first task 604-1 associated with the first time slot 602-1 prior to executing the second task 604-2 associated with a second time slot 602-2, in case the first task 604-1 has a higher priority with respect to the second task 604-2. The plurality autonomous machines 502 may decide to execute the second task 604-2 associated with the second time slot 602-2 prior to executing the third task 604-3 associated with a third time slot 602-3, in case the second task 604-2 has a higher priority with respect to the third task 604-3, etc. This scheme may ensure a timely completion of the main task or tasks associated with a mission, thus reducing the likelihood of relevant failures. From the point of view of the first machine 504, the method 651 may include carrying out the assignment of the respective time slot to each task of the one or more tasks 508 in coordination with the other machines 506. The method 651 may include executing the task(s) allocated to the first machine 504 during the respective time slot 602 assigned to the task. Illustratively, the tasks may be performed one after the other. The robots choose the subtask and they divide the total time in slots.

The time slots 602 may together form a time associated with the one or more tasks 508, e.g. a time associated with the mission, a time within which the plurality of autonomous machines 502 should complete the mission. The time slots 602 may have a same time duration, or different time durations based on the respectively associated task.

In other aspects, according to a simultaneous (or concurrent) execution scheme, the plurality of autonomous machines 502 may carry out the tasks of the one or more tasks 508 (after allocation) simultaneously or concurrently with one another. A method of executing the tasks (e.g., as part of the method 551) may include executing a task allocated to an autonomous machine (e.g., to the first machine 504) in synchronization with another autonomous machine (e.g., of the other machines 506) executing a further task of the one or more tasks 508 allocated thereto. This scheme may ensure a more timely completion of a mission.

In other aspects, according to the hybrid execution scheme, the plurality of autonomous machines 502 may carry out the tasks of the one or more tasks 508 (after allocation) in part one after the other, and in part simultaneously or concurrently with one another. A method of executing the tasks (e.g., as part of the method 551) may include executing a first task allocated to an autonomous machine (e.g., to the first machine 504) during an allocated time slot, and executing a second task allocated to an autonomous machine (e.g., to the first machine 504 or one of the other machines 506) in synchronization with another autonomous machine executing a third task allocated thereto.

In some aspects, the plurality of autonomous machines 502 may switch among the different execution modes, e.g. the execution may be initially according to a first mode (e.g., the sequential mode) and then the plurality of autonomous machines 502 may switch to a second mode (e.g., the simultaneous mode), etc. This may provide a dynamic adaptation of the execution of the one or more tasks 508, e.g. based on a changing scenario, or based on changing capabilities of the autonomous machines.

FIG. 7 shows a method 751 in accordance with various aspects 700 of the present disclosure, in a schematic communication diagram, which may be configured in accordance with aspects 100 to 600. One or more autonomous machines 150 may implement the method 751, namely the plurality of autonomous machines 502 (the first machine 504 and the other machines 506), e.g., the one or more processors 102 thereof and/or code segments that the one or more processors 102 execute. In some aspects, the method 751 may be part of the method 551 (e.g., of the negotiation 521). The method 751 may be understood as a method of electing a task allocator. For the purpose of illustration, the method 751 is described from the point of view of the first machine 504. The references made to the first machine 504 may be understood to apply analogously to the other machines 506.

The plurality of autonomous machines 502 may be configured to carry out the method 751 to elect among themselves a leader, responsible for the allocation of the one or more tasks 508 to the plurality of autonomous machines 502. Illustratively the method 751 may provide a centralized distribution of the one or more tasks 508, in which the plurality of autonomous machines 502 select one autonomous machine for the distribution (as described in further detail below, for example in relation to FIG. 8).

From the point of view of the first machine 504, the method 751 may include, in 721, negotiating with the other machines 506 and based on mission data (illustratively, based on information about the one or more tasks 508), which autonomous machine of the plurality of autonomous machines 502 becomes an allocator for the mission data (e.g., an allocator for the distribution of the one or more tasks 508). Illustratively, the negotiation 721 may be understood as a voting process in which an autonomous machine (e.g., the first machine 504) may cast a vote to elect as allocator itself or another autonomous machine of the plurality of autonomous machines 502. The voting may be based on one or more election criteria, as described in further detail below.

The method 751 (e.g., the negotiation 721) may include voting for at least one autonomous machine of the plurality of autonomous machines 502 to become the allocator for the mission data, and negotiating which autonomous machine of the plurality of autonomous machines 502 becomes the allocator for the mission data in accordance with a result of the vote. Each autonomous machine may communicate a respective vote 702 (via a respective message, e.g. according to a wireless communication protocol) to the other autonomous machines of the plurality of autonomous machines 502. Illustratively, from the point of view of the first machine 504, the method 751 may include generating a vote 702 for at least one autonomous machine of the plurality of autonomous machines 502 (in accordance with the election criteria), and communicating the vote 702 to the other machines 506.

The method 751 (e.g., the negotiation 721) may include selecting (or electing) which autonomous machine of the plurality of autonomous machines 502 becomes the allocator for the mission data in accordance with (e.g., based on) which autonomous machine of the plurality of autonomous machines 502 received the greatest number of votes to become the allocator for the mission data. The election may be majority-based, e.g. the autonomous machine with the most votes may become the leader. The majority-based approach may reduce or prevent the risk of electing the wrong leader, e.g. in case one or some of the autonomous machines vote for the wrong leader, for example due to considering non-updated information associated with the current scenario. The elected allocator may become responsible for distributing the tasks among the plurality of autonomous machines 502, as described in further detail below (see for example FIG. 8).

In some aspects, the method 751 (e.g., the negotiation 721) may include, as election criterion, negotiating which autonomous machine of the plurality of autonomous machines 502 becomes the allocator for the mission data based on which autonomous machine of the plurality of autonomous machines 502 is most qualified for carrying out the task with the highest priority associated therewith. The team may identify a "leader" based on mission policies or standing protocol (e.g., the leader may be responsible for the top mission task). The method 751 may include voting for the autonomous machine that has the greatest qualification to perform the task with the highest priority associated therewith.

In some aspects, the method 751 (e.g., the negotiation 721) may include, as election criterion, voting for which autonomous machine of the plurality of autonomous machines 502 becomes the allocator for the mission data based on the respective information about the one or more functions 510, 512 of the autonomous machine. From the point of view of the first machine 504, the method 751 may include voting for which autonomous machine of the plurality of autonomous machines 502 becomes the allocator for the mission data based on information about the one or more functions 510 of the first machine 504 and based on the information about the one or more functions 512 of the one or more other machines 506.

Figure 5:
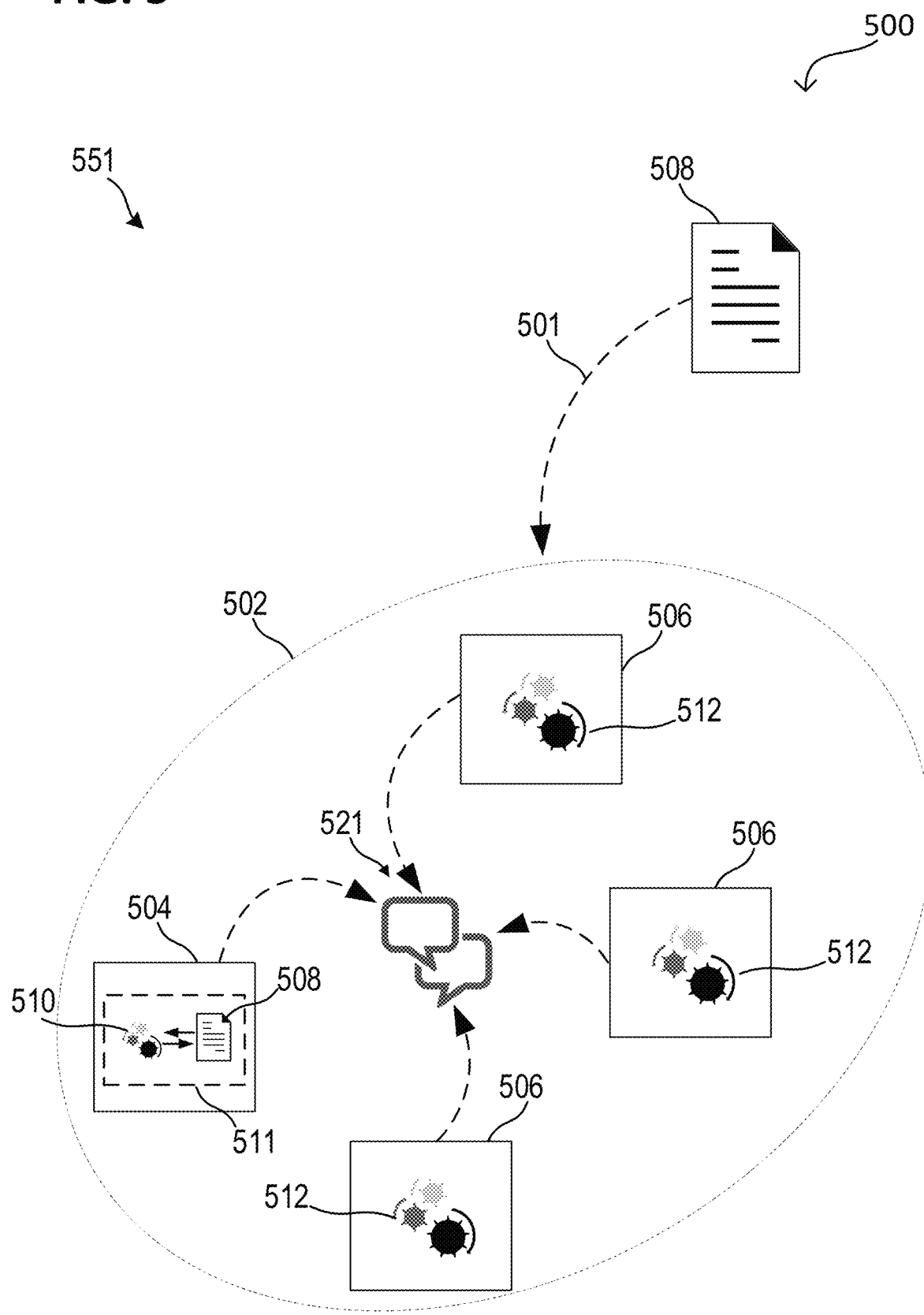
FIG. 5 shows a method in accordance with various aspects of the present disclosure in a schematic diagram.

As described in relation to FIG. 5, the information about the one or more functions 510, 512 of an autonomous machine may include a residual battery life of the autonomous machine, e.g. a residual expected time for which the autonomous machine may continue to operate. The autonomous machine with the greatest battery life may be the strongest candidate to become the allocator, as this may reduce or prevent the risk of unexpected interruptions in the distribution of the tasks. The method 751 (e.g., the negotiation 721) may include, as election criterion, voting for which autonomous machine of the plurality of autonomous machines 502 becomes the allocator for the mission data based on the respective residual battery life. The method 751 (e.g., the negotiation 721) may include voting for which autonomous machine of the plurality of autonomous machines 502 becomes the allocator for the mission data based on which autonomous machine of the plurality of autonomous machines 502 has the greatest residual battery life associated therewith (e.g., the method 751 may include voting for that autonomous machine).

As described in relation to FIG. 5, the information about the one or more functions 510, 512 of an autonomous machine may include a (current) workload of the autonomous machine. The autonomous machine with the smallest workload may be the strongest candidate to become the allocator, as this may ensure that the autonomous machine has enough available resources for its workload and for carrying out the task allocation. The method 751 (e.g., the negotiation 721) may include, as election criterion, voting for which autonomous machine of the plurality of autonomous machines 502 becomes the allocator for the mission data based on the respective workload. The method 751 (e.g., the negotiation 721) may include voting for which autonomous machine of the plurality of autonomous machines 502 becomes the allocator for the mission data based on which autonomous machine of the plurality of autonomous machines 502 has the smallest (in other words, the least, or the least resource demanding) workload associated therewith (e.g., the method 751 may include voting for that autonomous machine).

In some aspects, the method 751 (e.g., the negotiation 721) may include, as election criterion, voting for which autonomous machine of the plurality of autonomous machines 502 becomes the allocator for the mission data based on the respective information about the one or more previous tasks, e.g. based on the respective history or previous experience. The method 751 (e.g., the negotiation 721) may include voting for which autonomous machine of the plurality of autonomous machines 502 becomes the allocator for the mission data based on which autonomous machine of the plurality of autonomous machines 502 has the most relevant experience in relation to the one or more tasks 508.

The negotiation 721 may illustratively be described as follows. The system builds the list of trusted neighbors and the support they offer. The system may choose nodes based on the prescribed policy, e.g. the system may choose the node with the highest resident battery life and less load as a leader for a network to control and direct the collaborative work.

It is understood that the election criteria described herein are exemplary, and additional, less, or alternative criteria may be provided (e.g., based on different properties of the current scenario, based on different properties of the mission, based on different properties of the plurality of autonomous machines, etc.).

In some aspects, the elected leader may vary over time, e.g. following a change in the scenario, a change in the one or more functions of the leader, etc. As an example, the method 751 may include repeating the negotiation 721 at periodic intervals (e.g., after the completion of a task, after the completion of five tasks, as examples, or every minute, or every five minutes, as other examples). As another example, the method 751 may include repeating the negotiation 721 in case the allocator indicates a variation in its status, e.g. in case the allocator generates a message to the plurality of autonomous machines 502 indicating a reduced residual battery life, or an increased workload, which may indicate that another autonomous machine should become the allocator.

FIG. 8 shows a method 851 in accordance with various aspects 800 of the present disclosure, in a schematic communication diagram, which may be configured in accordance with aspects 100 to 700. One or more autonomous machines 150 may implement the method 851, namely the plurality of autonomous machines 502 (the first machine 504 and the other machines 506), e.g., the one or more processors 102 thereof and/or code segments that the one or more processors 102 execute. In some aspects, the method 851 may be part of the method 551 (e.g., of the negotiation 521) and/or of the method 751 (e.g., of the negotiation 721). In some aspects, the method 851 may be understood as a method for allocating a task.

The method 851 may illustrate the operation of an allocator for allocating a task to an autonomous machine of the plurality of autonomous machines 502. For the purpose of illustration of the method 851 it is assumed that the first machine 504 may be the allocator (as result of the negotiation 721), and may also be referred to in the following as allocator 504a or first machine 504a. For the purpose of illustration of the method 851 only one other autonomous machine 506 is illustrated, also referred to in the following as other machine 506-1. It is however understood that the method 851 may include the allocation of tasks to more than one other autonomous machine 506-1. The references made to the first machine 504a may be understood to apply analogously to the other machines 506 (e.g., to the other machine 506-1).

The method 851 may include, in 811, comparing mission data (e.g., information about the one or more tasks 508) with information about one or more functions 512 (e.g., capability and/or role) of a further autonomous machine (e.g., of the other machine 506-1, from the point of view of the allocator 504a). The comparison 811 may include determining (e.g., assessing) whether (and at what level) the other machine 506-1 is qualified to perform the one or more tasks 508. For each task of the one or more tasks 508, the comparison 811 may include determining the qualification of the other machine 506-1 to perform that task. In some aspects, the comparison 811 may include comparing mission data with information about one or more previous tasks associated with the other machine 506-1 (e.g., with information about the experience of the other machine 506-1).

The method 851 may include, in 821, allocating a task 802 of the one or more tasks 508 to the further autonomous machine (e.g., to the other machine 506-1) based on a result of the comparison 811. The method 851 (e.g., the allocation 821) may include generating a message (e.g., according to a wireless communication protocol) describing a task 802 (or a plurality of tasks) that the allocator 504a allocated to the other machine 506-1, and communicating the message to the other machine 506-1. The message may include information about the allocation of the task 802 to the other machine 506-1.

In some aspects, the allocation 821 may be based on the result of the respective comparisons 811 that the allocator 504a carries out for each autonomous machine of the plurality of autonomous machines 502 (to determine which autonomous machine is most qualified to perform that task). The allocator 504a may also allocate a task to itself, based on the comparison 811 of the information about its one or more functions 510 with the mission data, e.g. in case the allocator 504 determines that it is the most qualified autonomous machine to perform that task.

An autonomous machine receiving a task from the allocator may accept the task. From the point of view of the other machine 506-1, the method 851 may include associating (e.g., accepting) a task of the one or more tasks to the other machine 506-1 based on the message that the allocator 504a may generate (or may have generated) in accordance with a wireless communication protocol.

In some aspects, the allocator 504a may carry out a re-allocation of the task 802 to a further autonomous machine in case the (initially allocated) other machine 506-1 fails or at least partially fails to carry out the task 802. The new autonomous machine may be the next most qualified to perform the task 802 after the other machine 506-1. Illustratively, the allocator 504a may be responsible for ensuring the correct workflow, also in case of unexpected events and malfunctions. The method 851 may include allocating the task 802 to a further autonomous machine in case the other machine 506-1 at least partially fails to carry out the task.

As described in relation to FIG. 5, the re-allocation of tasks may occur also in absence of an allocator 504a. As an additional or alternative aspect, the re-allocation of tasks may occur also in case an allocator 504a is present, but it is momentarily unable to perform the re-allocation. Aspects of this dynamic distributed mission management flows into execution phase, in particular, in case a robot fails and needs a backup. In this case, if the backup robot "hears" or is aware of this gap, it can announce it will take the task on. If the robots are widely separated then a robot within range, if capable, can pick up the task and there would be a cascade effect as they cover for each other. Being able to have this resilience even if the leader is out of communication and unable to re-assign an asset may ensure a correct completion of a mission. This team dynamic makes a group of robots better self-optimizing to unpredictable conditions.

The methods 551 to 851 associated with the aspects 500 to 800 may be illustratively described as follows. (1) In a discovery phase, each autonomous robot broadcast its execution capacity (capabilities, telemetry, the snapshot of power/performance profile, as examples), e.g. including the comparison of robot capabilities table against mission priority table. (2) In an arbitration phase, the autonomous robots "compete" for task assignment according to a centralized arbitration and/or a distributed arbitration. (3) In a provisioning phase, upon successful arbitration an autonomous robot may obtain a permit (license to operate) that defines the role of the robot and assigns the task(s). (4) In an execution phase, based on the received permit, the autonomous robots execute the tasks, according to a sequential mode, simultaneous mode, or hybrid mode. (5) In a scope change phase, an autonomous robot may obtain a new permit as a part of collaborative assignment or change role upon expiration of the permit. The life cycle of the CSLSO may be seen as follows: Discovery, Provisioning, Execution, Scope Change, back to Provisioning.

FIG. 9 shows a method 951 in accordance with various aspects 900 of the present disclosure, in a schematic communication diagram, which may be configured in accordance with aspects 100 to 800. One or more autonomous machines 150 may implement the method 951, namely the plurality of autonomous machines 502 (the first machine 504 and the other machines 506, in FIG. 9 represented as one other machine 506), e.g., the one or more processors 102 thereof and/or code segments that the one or more processors 102 execute. In some aspects, the method 951 may be part of the method 551 (e.g., of the negotiation 521) and/or of the method 751 (e.g., of the negotiation 721), and/or of the method 851.

The method 951 may include, in 911, the plurality of autonomous machines 502 (1 to N robots) broadcasting of availability and resource capability among themselves, e.g. the plurality of autonomous machines 502 each generating a respective message to the other autonomous machines of the plurality of autonomous machines 502 indicating the respective qualification for the mission data.

The method 951 may include, in 921, the plurality of autonomous machines 502 forming an ad-hoc group and optionally (e.g., in case of a centralized arbitration) electing as leader the node with highest residual energy (or based on another election criterion, as described in relation to FIG. 7).

The method 951 may include, in 931, the plurality of autonomous machines 502 (the robots) exchanging credentials (e.g., permit) with permit server 902 for authentication. Each autonomous machine may be associated with a respective exchange of credentials, e.g. the first autonomous machine 504 with a first exchange of credentials 931-1, . . . , the n-th autonomous machine 506 with a n-th exchange of credentials 931-n.

The method 951 may include, in 941, the plurality of autonomous machines 502 (the robots) downloading the task content, optionally the leader node may coordinate the download (e.g., in case of a centralized arbitration) or via the permit server (e.g., in case of a distributed arbitration).

FIG. 10 shows a method 1051 in accordance with various aspects 1000 of the present disclosure, in a schematic communication diagram, which may be configured in accordance with aspects 100 to 900. One or more autonomous machines 150 may implement the method 1051, namely the plurality of autonomous machines 502 (not shown in FIG. 10), e.g., the one or more processors 102 thereof and/or code segments that the one or more processors 102 execute. In some aspects, the method 1051 may be part of the methods 551 to 951 described in relation to FIG. 5 to FIG. 9.

The method 1051 may include, in 1011, a start (e.g., a starting phase). The start 1011 may include, for example, determining whether there are autonomous machines available to build a network of trusted neighbors for carrying out a mission.

The method 1051 may include, in 1021, making one or more tasks 508 available to the autonomous machines, e.g. providing a description of the one or more tasks (a subtask description) to the autonomous machines.

The method 1051 may include, in 1031, the arbitration (e.g., the negotiation 521, 721), in which the autonomous machines discuss among themselves how to best distribute the tasks 508, and optionally elect a leader for allocating the tasks 508.

The method 1051 may include, in 1041, a monitoring of the task status (task status monitor), e.g. carrying out an analysis of the current state of the task execution, e.g. to decide whether to re-assign a task to a different autonomous machine, whether to switch to a different execution scheme, whether to elect a new leader, etc.

The method 1051 may include, in 1061, executing the tasks (task execution), in which the autonomous machines execute the respectively allocated task (or tasks), e.g. according to one of the execution modes described in relation to FIG. 6.

FIG. 11 shows a method 1151 in accordance with various aspects 1100 of the present disclosure, in a schematic communication diagram, which may be configured in accordance with aspects 100 to 1000. One or more autonomous machines 150 may implement the method 1151, namely the plurality of autonomous machines 502 (the first machine 504 and the other machines 506), e.g., the one or more processors 102 thereof and/or code segments that the one or more processors 102 execute. In some aspects, the method 1151 may be part of the methods 551 to 1051 described in relation to FIG. 5 to FIG. 10. The method 1151 may be understood as a method for allocating a task, e.g. as a method in which an allocator distributes the tasks among the plurality of autonomous machines 502.

For the purpose of explanation of the method 1151 it is assumed that the first machine 504 (Robot 1) may initially be the elected allocator 504a (in other words, the leader of the plurality of autonomous machines 502). The method 1151 may include, in 1111, the allocator 504a querying individual nodes contribution capacity. The querying 1111 may include the allocator 504a interrogating the other machines 506 to obtain information about the respective functions, e.g. the respective qualifications in relation to the tasks that the allocator 504a should distribute. The querying 1111 may include the allocator 504a transmitting and receiving messages to and from the other machines 506, e.g. according to a wireless communication protocol. The querying 1111 may include a respective querying for each other machine 506, e.g. a first querying 1111-1 (for Robot 2), a second querying 1111-2 (for Robot 3), ..., an n-th querying 1111-n (for Robot N).

The method 1151 may include, in 1121, the allocator 504a (the leader) dividing the work and distributing the tasks to its neighbors 506. The distribution may be based on the querying 1111, e.g. on the information about the respective functions of the other machines 506. The distribution 1121 may include a respective distribution for each other machine 506, e.g. a first distribution 1121-1 (for Robot 2), a second distribution 1121-2 (for Robot 3), ..., an n-th distribution 1121-n (for Robot N).

The method 1151 may include, in 1131, the allocator 504a (the leader) assembling the components that the neighbors/peers generate. The assembling 1131 may include a respective assembling for each other machine 506, e.g. a first assembling 1131-1 (for Robot 2), a second assembling 1131-2 (for Robot 3), ..., an n-th assembling 1131-n (for Robot N).

The method 1151 may include electing a new leader, e.g. after completion of a mission, after a predefined time period, in case of a change in the scenario, as examples. As illustrated in FIG. 11, for the next cycle one of the other machines 506 (e.g., Robot 3) may become the new leader 506a, for example depending on the workload and residual battery life.

Figure 12:
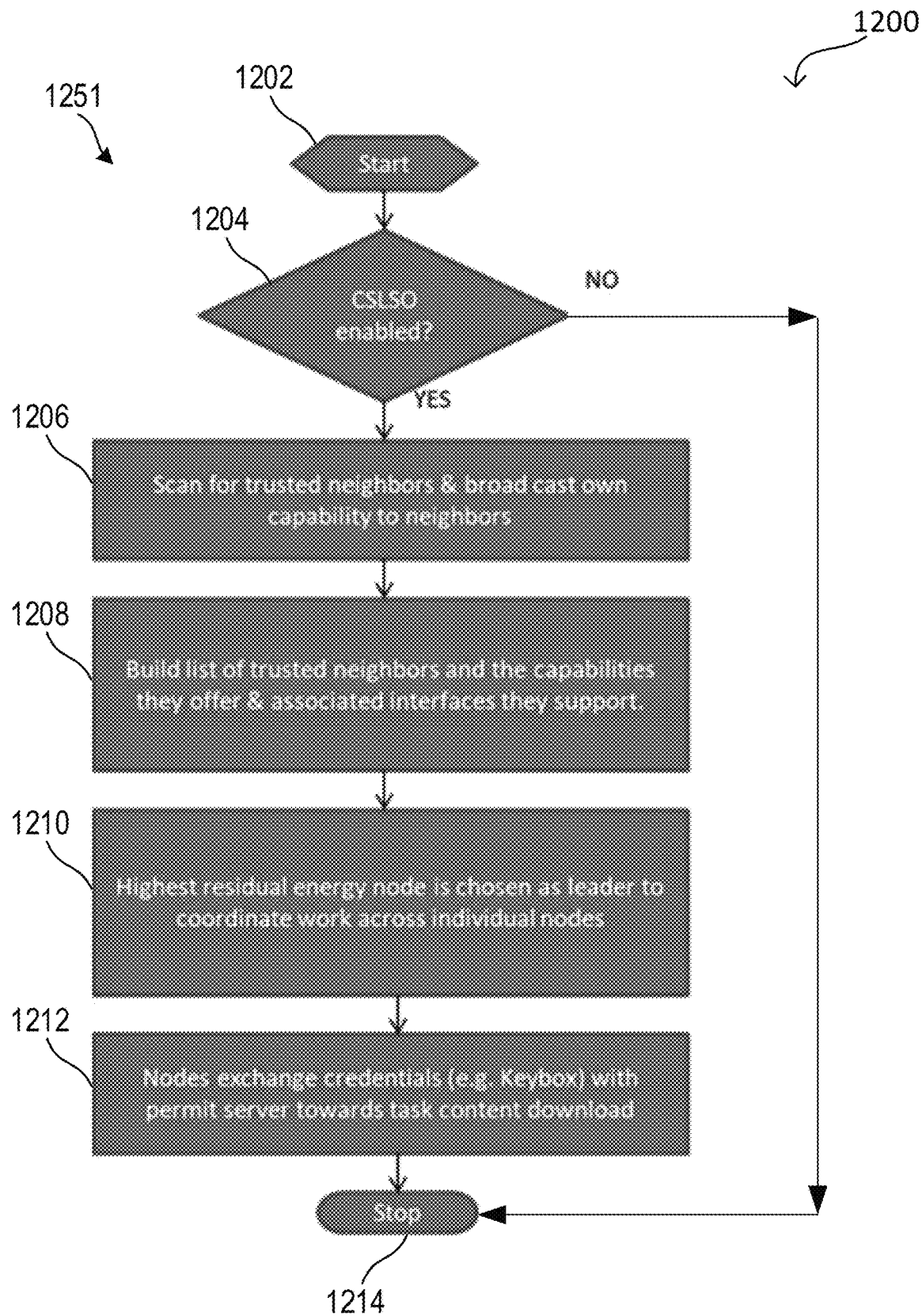
FIG. 12 shows a method in accordance with various aspects of the present disclosure in a schematic flow diagram.

FIG. 12 shows a method 1251 in accordance with various aspects 1200 of the present disclosure, in a schematic flow diagram, which may be configured in accordance with aspects 100 to 1100. One or more autonomous machines 150 may implement the method 1251, namely the plurality of autonomous machines 502 (not shown in FIG. 12), e.g., the one or more processors 102 thereof and/or code segments that the one or more processors 102 execute. In some aspects, the method 1251 may be part of the methods 551 to 1151 described in relation to FIG. 5 to FIG. 11.

The method 1251 may start in 1202 and may include, in 1204, checking whether the CSLSO is enabled. If the checking in 1204 results in yes ("YES" in 1204), the method 1251 continues, in 1206, with scanning for trusted neighbors and broadcasting own capabilities to the neighbors. The method 1251 continues, in 1208, with building a list of trusted neighbors and the capabilities they offer and the associated interfaces they support. The method 1251 continues, in 1210 with electing as a leader the highest residual energy node (as an example, or based on another election criterion) to coordinate work across the individual nodes. The method 1251 continues, in 1212, with the nodes exchanging credentials (e.g., keybox) with the permit server towards task content download. Then the method 1251 stops in 1214. If the checking in 1204 results in no ("NO" in 1204), the method stops in 1214.

Figure 13:
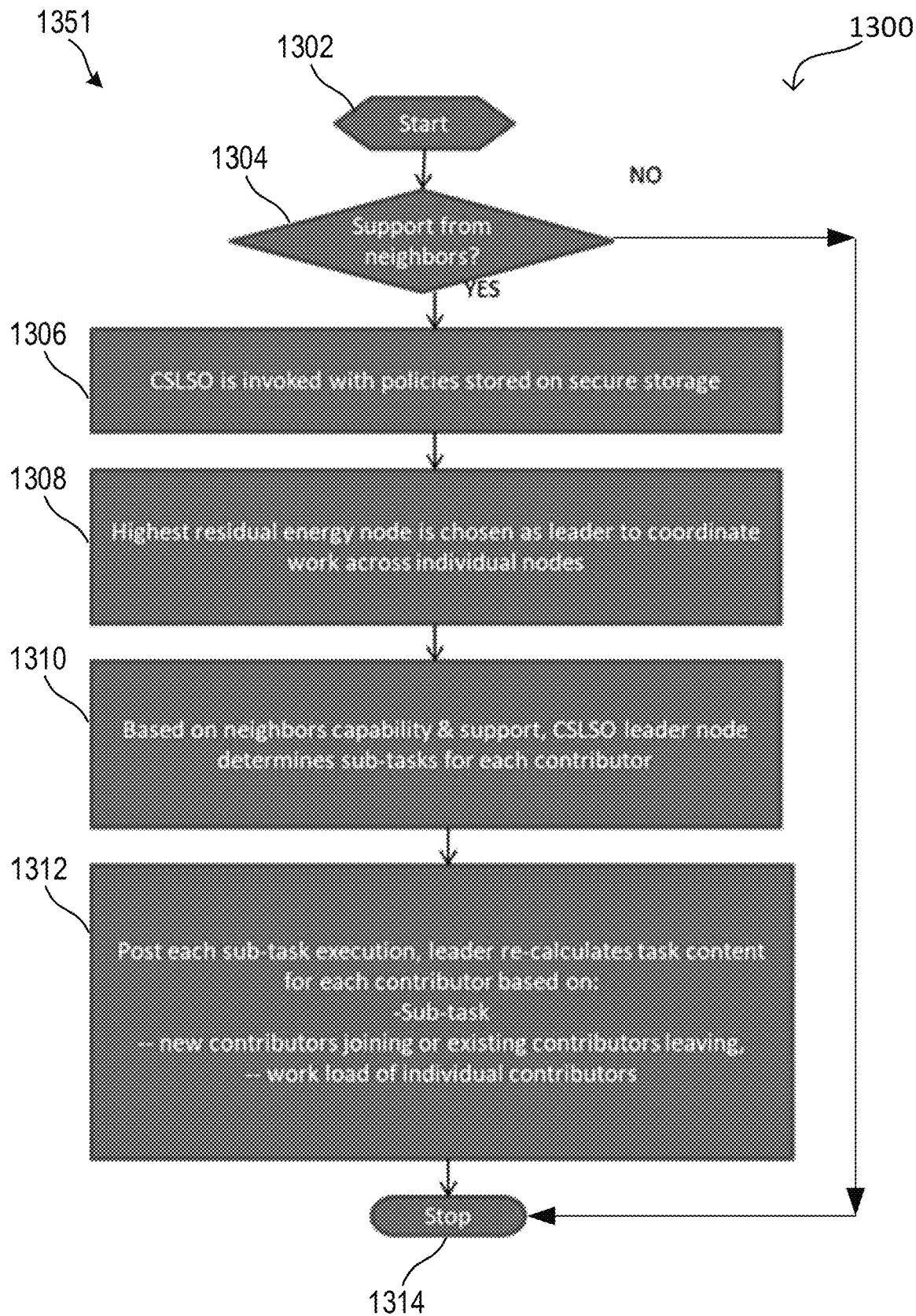
FIG. 13 shows a method in accordance with various aspects of the present disclosure in a schematic flow diagram.

FIG. 13 shows a method 1351 in accordance with various aspects 1300 of the present disclosure, in a schematic flow diagram, which may be configured in accordance with aspects 100 to 1200. One or more autonomous machines 150 may implement the method 1351, namely the plurality of autonomous machines 502 (not shown in FIG. 13), e.g., the one or more processors 102 thereof and/or code segments that the one or more processors 102 execute. In some aspects, the method 1351 may be part of the methods 551 to 1251 described in relation to FIG. 5 to FIG. 12.

The method 1351 may start in 1302 and may include, in 1304, checking whether there is support from neighbors. If the checking in 1304 results in yes ("YES" in 1304), the method 1351 continues, in 1306, with invoking CSLSO with policies stored on a secure storage. The method 1351 continues, in 1308, with electing as a leader the highest residual energy node (as an example, or based on a different election criterion) to coordinate work across the individual nodes. The method 1351 continues, in 1310, with the CSLSO leader node determining the sub-tasks for each contributor based on neighbor's capability and support. The method 1351 continues, in 1312, with the leader re-calculating the task content for each contributor, post each sub-task execution, based on: the sub-task; and/or whether new contributors are joining or existing contributors are leaving; and/or the workload of individual contributors. Then the method 1351 stops in 1314. If the checking in 1304 results in no ("NO" in 1304), the method stops in 1314.

Illustratively, the method 1351 shown in FIG. 13 may describe the operation of the CSLSO. Based on the user configuration (policies, etc.) stored in the secure storage, the CSLSO leader in cooperation with license server may determine the subtasks for each contributor based on the nodes availability/capability to collaborate and their support to distribute the task pipeline. New nodes can join an existing network of devices to contribute. Existing nodes in a configuration can drop off. CSLSO may consider these when recalculating subtasks.

Figure 14:
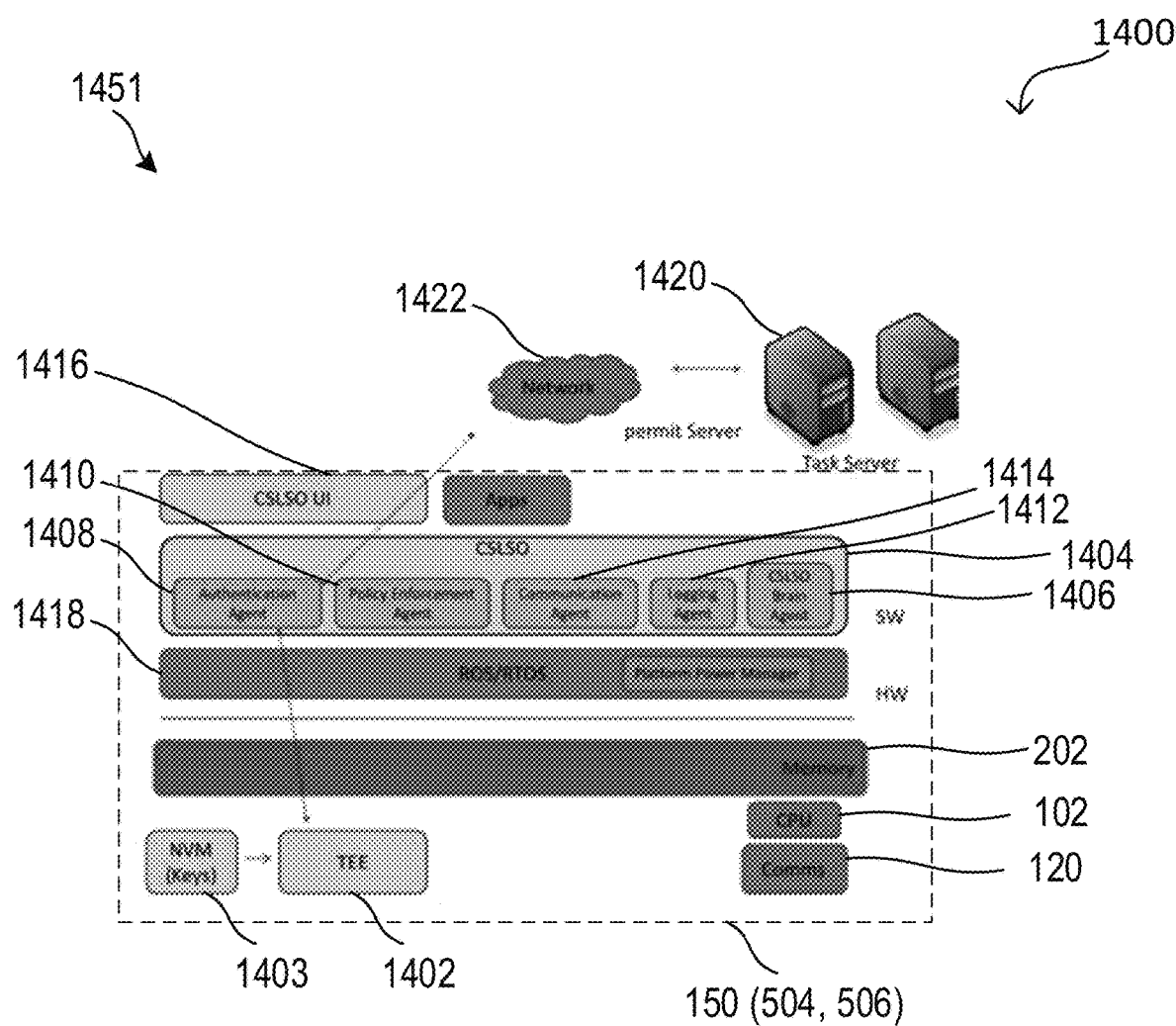
FIG. 14 shows a system in accordance with various aspects of the present disclosure in a schematic diagram.

FIG. 14 shows a system 1451 in accordance with various aspects 1400 of the present disclosure, in a schematic diagram, which may be configured in accordance with aspects 100 to 1300. The system 1451 may be an example of a system configured to implement the methods 551 to 1351 described in relation to FIG. 5 to FIG. 13.

The system 1451 may include an autonomous machine 150 (e.g., the first autonomous machine 504, or one of the other autonomous machines 506). The autonomous machine 150 may include host CPU 102 and memory 202 to provide the compute and storage capability. The autonomous machine 150 may include a security engine 1402 (TEE, Trusted Execution Environment), which may include a hardware-based security engine configured to provide the necessary cryptographic operations and a tamper proof secure execution environment. The security engine 1402 may communicate with a non-volatile memory 1403 storing keys (e.g., authentication keys). The autonomous machine 150 may include a CSLSO software component 1404 configured to utilize the Platform TEE towards collaborative task management. The CSLSO software component 1404 may be configured to securely control and communicate with neighboring devices. The CSLSO software component 1404 may include a CSLSO Brain Agent 1406, which may be a module configured for task arbitration and assignment. The CSLSO software component 1404 may include an authentication agent 1408 configured to utilize the Security Engine to authenticate the device with trusted neighbors and with the license infrastructure (e.g., with the task server 1420, over the network 1422). The CSLSO software component 1404 may include a Policy Storage/Enforcement agent 1410 configured to manage policy information and configured to carry out storage and/or retrieval from secure storage. The CSLSO software component 1404 may include a Logging Agent 1412 configured to log all the transactions based on user configuration. The CSLSO software component 1404 may include a Communication Agent 1414 configured to provide secure communication between devices.

The autonomous machine 150 may include one or more communication devices 120 configured to provide communication capabilities, e.g. radios like GPS, Wi-Fi, WiMax, Bluetooth, etc. The autonomous machine 150 may include a CSLSO User interface 1416, which may be an application component configured to interface with the CSLSO and the user. The autonomous machine 150 may include an operating system 1418, e.g. a host operating system configured to manage the platform resources. For robots the operating system may be the Robotic Operating System (ROS).

In the following, various aspects of the present disclosure will be illustrated:

Example 1 is a method for allocating a task to an automated (e.g., autonomous) machine, the method including: comparing information about one or more functions of the automated (e.g., autonomous) machine with information about one or more tasks available to a plurality of automated (e.g., autonomous) machines including the automated (e.g., autonomous) machine and one or more further automated (e.g., autonomous) machines; and negotiating, with the one or more further automated (e.g., autonomous) machines and based on a result of the comparison, which task of the one or more tasks is allocated to the automated (e.g., autonomous) machine.

In Example 2, the method according to example 1 may optionally further include that the comparison includes: determining a qualification of the automated (e.g., autonomous) machine to perform a first task of the one or more tasks based on the information about the one or more functions of the automated (e.g., autonomous) machine; and that the negotiation includes allocating the automated (e.g., autonomous) machine to the first task, when the qualification fulfills a criterion.

In Example 3, the method according to example 2 may optionally further include that the criterion is fulfilled when the qualification of the automated (e.g., autonomous) machine is greater than a qualification of each automated (e.g., autonomous) machine of the one or more further automated (e.g., autonomous) machines to perform the first task.

In Example 4, the method according to example 2 or 3 may optionally further include that the criterion is fulfilled when a first automated (e.g., autonomous) machine of the one or more further automated (e.g., autonomous) machines, which has a higher qualification to perform the first task, at least partially fails to complete the first task.

In Example 5, the method according to any one of examples 1 to 4 may optionally further include that the negotiation includes, for each task of the one or more tasks, determining whether another automated (e.g., autonomous) machine of the one or more further automated (e.g., autonomous) machines is more qualified than the automated (e.g., autonomous) machine for carrying out the task, based on the result of the comparison.

In Example 6, the method according to any one of examples 1 to 5 may optionally further include that the comparison includes comparing the information about one or more functions of the automated (e.g., autonomous) machine with further information about one or more further functions of the one or more further automated (e.g., autonomous) machines.

In Example 7, the method according to example 6 may optionally further include obtaining the further information from the one or more further automated (e.g., autonomous) machines.

In Example 8, the method according to example 6 or 7 may optionally further include that the negotiation is further based on the comparison of the further information with the information and/or with the one or more tasks.

In Example 9, the method according to any one of examples 6 to 8 may optionally further include that the negotiation includes, for each task of the one or more tasks, determining whether another automated (e.g., autonomous) machine of the one or more further automated (e.g., autonomous) machines is more qualified than the automated (e.g., autonomous) machine for carrying out the task, based on the further information.

In Example 10, the method according to any one of examples 1 to 9 may optionally further include that the negotiation includes allocating the task to the automated (e.g., autonomous) machine upon determining that the automated (e.g., autonomous) machine is more qualified than any other automated (e.g., autonomous) machine of the one or more further automated (e.g., autonomous) machines for carrying out the task.

In Example 11, the method according to any one of examples 1 to 10 may optionally further include that the negotiation includes allocating the task to another automated (e.g., autonomous) machine of the one or more further automated (e.g., autonomous) machines, upon determining that the other automated (e.g., autonomous) machine is more qualified than the automated (e.g., autonomous) machine for carrying out the task.

In Example 12, the method according to any one of examples 1 to 11 may optionally further include obtaining an indication that a first automated (e.g., autonomous) machine of the one or more further automated (e.g., autonomous) machines at least partially failed to carry out a task of the one or more tasks allocated to the first automated (e.g., autonomous) machine, and allocating the task to the automated (e.g., autonomous) machine.

In Example 13, the method according to any one of examples 1 to 12 may optionally further include that each task of the one or more tasks has a priority associated therewith, and that the method further includes assigning each task of the one or more tasks to a respective time slot based on a respective priority of each task, and controlling an execution of the task allocated to the automated (e.g., autonomous) machine during the respective time slot assigned to the task.

In Example 14, the method according to any one of examples 1 to 12 may optionally further include controlling an execution of the task allocated to the automated (e.g., autonomous) machine in synchronization with the execution of a further task of the one or more tasks allocated to another automated (e.g., autonomous) machine of the one or more further automated (e.g., autonomous) machines.

In Example 15, the method according to any one of examples 1 to 14 may optionally further include that the information about the one or more functions of the automated (e.g., autonomous) machine include information about at least one of: a current operational condition of the automated (e.g., autonomous) machine, a current location of the automated (e.g., autonomous) machine, an availability of the automated (e.g., autonomous) machine, and one or more operational parameters associated with the automated (e.g., autonomous) machine.

In Example 16, the method according to any one of examples 1 to 15 may optionally further include determining the information about one or more functions of the automated (e.g., autonomous) machine in accordance with a permit associated with the automated (e.g., autonomous) machine, wherein the permit describes the capabilities and the authorizations associated with the automated (e.g., autonomous) machine.

In Example 17, the method according to any one of examples 1 to 16 may optionally further include closing the negotiation when, for each task of the one or more tasks, one automated (e.g., autonomous) machine of the plurality of automated (e.g., autonomous) machines is allocated to the task.

In Example 18, the method according to any one of examples 1 to 17 may optionally further include that the negotiation includes generating a message to the one or more further automated (e.g., autonomous) machines, the message including a result of the comparison.

In Example 19, the method according to any one of examples 1 to 18 may optionally further include that the result of the comparison includes a candidature of the automated (e.g., autonomous) machine for a task of the one or more tasks.

In Example 20, the method according to any one of examples 1 to 19 may optionally further include that the comparison includes comparing a rating attributed to each of the one or more functions of the automated (e.g., autonomous) machine with the information about the one or more tasks.

In Example 21, the method according to any one of examples 1 to 20 may optionally further include receiving information about an execution of a task allocated to another automated (e.g., autonomous) machine of the one or more automated (e.g., autonomous) machines, and scaling up or down the capabilities of the automated (e.g., autonomous) machine based on the received information.

Example 22 is a controller (e.g. for an automated (e.g., autonomous) machine) including one or more processors configured to perform the method according to one of examples 1 to 21.

Example 23 is one or more non-transitory computer readable media including programmable instructions thereon, that when executed by one or more processors of a device (e.g., of an automated machine), cause the device to perform the method according to any one of examples 1 to 21.

Example 24 is an automated (e.g., autonomous) machine including the controller according to example 22 and/or the one or more non-transitory computer-readable media according to example 23.

Example 25 is a method of an automated (e.g., autonomous) machine allocating a task, the method including: negotiating, with one or more further automated (e.g., autonomous) machines and based on mission data, which automated (e.g., autonomous) machine of a plurality of automated (e.g., autonomous) machines becomes an allocator for the mission data, the mission data including information about one or more tasks offered to a plurality of automated (e.g., autonomous) machines including the automated (e.g., autonomous) machine and one or more further automated (e.g., autonomous) machines; and associating at least one task of the one or more tasks to the automated (e.g., autonomous) machine based on a message that the allocator may generate in accordance with a wireless communication protocol.

In Example 26, the method according to example 25 may optionally further include that the information about the one or more tasks include a priority associated with each task of the one or more tasks, and wherein the negotiation includes negotiating which automated (e.g., autonomous) machine of the plurality of automated (e.g., autonomous) machines becomes an allocator for the mission data in accordance with which automated (e.g., autonomous) machine of the plurality of automated (e.g., autonomous) machines is most qualified for carrying out the task with the highest priority associated therewith.

In Example 27, the method according to example 25 or 26 may optionally further include obtaining information about one or more functions of the one or more further automated (e.g., autonomous) machines, and that the negotiation includes voting for which automated (e.g., autonomous) machine of the plurality of automated (e.g., autonomous) machines becomes an allocator for the mission data in accordance with information about one or more functions of the automated (e.g., autonomous) machine and with the information about the one or more functions of the one or more further automated (e.g., autonomous) machines.

In Example 28, the method according to example 27 may optionally further include that the information about the one or more functions of the one or more further automated (e.g., autonomous) machines include at least one of a residual battery life and/or a workload associated with the one or more further automated (e.g., autonomous) machines, and that the information about the one or more functions of the automated (e.g., autonomous) machine include at least one of a residual battery life and/or a workload associated with the automated (e.g., autonomous) machine.

In Example 29, the method according to example 28 may optionally further include that the negotiation includes voting for which automated (e.g., autonomous) machine of the plurality of automated (e.g., autonomous) machines becomes an allocator for the mission data in accordance with which automated (e.g., autonomous) machine of the plurality of automated (e.g., autonomous) machines has the greatest battery life and/or the least workload associated therewith.

In Example 30, the method according to any one of examples 25 to 29 may optionally further include voting for which automated (e.g., autonomous) machine of the plurality of automated (e.g., autonomous) machines becomes an allocator for the mission data and selecting which automated (e.g., autonomous) machine of the plurality of automated (e.g., autonomous) machines becomes the allocator for the mission data in accordance with a result of the vote.

In Example 31, the method according to example 30 may optionally further include that the negotiation includes selecting which automated (e.g., autonomous) machine of the plurality of automated (e.g., autonomous) machines becomes the allocator for the mission data based on which automated (e.g., autonomous) machine of the plurality of automated (e.g., autonomous) machines received the greatest number of votes.

Example 32 is a controller (e.g. for an automated (e.g., autonomous) machine), including one or more processors configured to perform the method according to one of examples 25 to 31.

Example 33 is one or more non-transitory computer readable media including programmable instructions thereon, that when executed by one or more processors of a device (e.g., of an automated machine), cause the device to perform the method according to any one of examples 25 to 31.

Example 34 is an automated (e.g., autonomous) machine including the controller according to example 32 and/or the one or more non-transitory computer-readable media according to example 33.

Example 35 is a method for allocating a task to an automated (e.g., autonomous) machine, the method including: comparing mission data with information about one or more functions of a further automated (e.g., autonomous) machine, the mission data including information about one or more tasks offered to a plurality of automated (e.g., autonomous) machines including the automated (e.g., autonomous) machine and the further automated (e.g., autonomous) machine; and allocating at least one task of the one or more tasks to the further automated (e.g., autonomous) machine based on a result of the comparison.

Example 36 is a controller (e.g. for an automated (e.g., autonomous) machine), including one or more processors configured to perform the method according to example 35.

Example 37 is one or more non-transitory computer readable media including programmable instructions thereon, that when executed by one or more processors of a device (e.g., of an automated machine), cause the device to perform the method according to example 35.

Example 38 is an automated (e.g., autonomous) machine including the controller according to example 36 and/or the one or more non-transitory computer-readable media according to example 37.

Example 39 is a method for allocating a task to an automated (e.g., autonomous) machine, the method including: comparing information about one or more functions of the automated (e.g., autonomous) machine with information about one or more tasks available to a plurality of automated (e.g., autonomous) machines including the automated (e.g., autonomous) machine and one or more further automated (e.g., autonomous) machines; generating a message in accordance with a wireless communication protocol to the one or more further automated (e.g., autonomous) machines of the plurality of automated (e.g., autonomous) machines, the message being based on the comparison.

In Example 40, the method according to example 39 may optionally further include negotiating a mission group with the one or more further automated (e.g., autonomous) machines in accordance with a group communication protocol via one or more communication interfaces.

In Example 41, the method according to example 40 may optionally further include negotiating the mission group based on the result of the comparison and/or based on a capability of the one or more further automated (e.g., autonomous) machines communicated to the automated (e.g., autonomous) machine in accordance with the group communication protocol via the one or more communication interfaces.

Example 42 is a controller (e.g. for an automated (e.g., autonomous) machine), including one or more processors configured to perform the method according to any one of examples 39 to 41.

Example 43 is one or more non-transitory computer readable media including programmable instructions thereon, that when executed by one or more processors of a device (e.g., of an automated machine), cause the device to perform the method according to any one of examples 39 to 41.

Example 44 is an automated (e.g., autonomous) machine including the controller according to example 42 and/or the one or more non-transitory computer-readable media according to example 43.

Example 45 are controlling means for an automated (e.g., autonomous) machine, the controlling means including: processing means for: comparing information about one or more functions of the automated (e.g., autonomous) machine with information about one or more tasks available to a plurality of automated (e.g., autonomous) machines including the automated (e.g., autonomous) machine and one or more further automated (e.g., autonomous) machines; negotiating, with the one or more further automated (e.g., autonomous) machines and based on a result of the comparison, which task of the one or more tasks is allocated to the automated (e.g., autonomous) machine.

Example 46 are controlling means for an automated (e.g., autonomous) machine, the controlling means including: processing means for: negotiating, with one or more further automated (e.g., autonomous) machines and based on mission data, which automated (e.g., autonomous) machine of a plurality of automated (e.g., autonomous) machines becomes an allocator for the mission data, the mission data including information about one or more tasks offered to a plurality of automated (e.g., autonomous) machines including the automated (e.g., autonomous) machine and one or more further automated (e.g., autonomous) machines; and associating at least one task of the one or more tasks to the automated (e.g., autonomous) machine based on a message that the allocator may generate in accordance with a wireless communication protocol.

Example 47 are controlling means for an automated (e.g., autonomous) machine, the controlling means including: processing means for: comparing mission data with information about one or more functions of a further automated (e.g., autonomous) machine, the mission data including information about one or more tasks offered to a plurality of automated (e.g., autonomous) machine including the automated (e.g., autonomous) machine and the further automated (e.g., autonomous) machine; and allocating at least one task of the one or more tasks to the further automated (e.g., autonomous) machine based on a result of the comparison.

Example 48 are controlling means for an automated (e.g., autonomous) machine, the controlling means including: processing means for: comparing information about one or more functions of the automated (e.g., autonomous) machine with information about one or more tasks available to a plurality of automated (e.g., autonomous) machines including the automated (e.g., autonomous) machine and one or more further automated (e.g., autonomous) machines; generating a message in accordance with a wireless communication protocol to the one or more further automated (e.g., autonomous) machines of the plurality of automated (e.g., autonomous) machines, the message being based on the comparison.

Example 49 is a controller for an automated (e.g., autonomous) machine, the controller including: one or more processors configured to: compare information about one or more functions of the automated (e.g., autonomous) machine with information about one or more tasks available to a plurality of automated (e.g., autonomous) machines including the automated (e.g., autonomous) machine and one or more further automated (e.g., autonomous) machines; negotiate, with the one or more further automated (e.g., autonomous) machines and based on a result of the comparison, which task of the one or more tasks is allocated to the automated (e.g., autonomous) machine.

In Example 50, the controller according to example 49 may optionally further include that the comparison includes: determining a qualification of the automated (e.g., autonomous) machine to perform a first task of the one or more tasks based on the information about the one or more functions of the automated (e.g., autonomous) machine; and that the negotiation includes allocating the automated (e.g., autonomous) machine to the first task, when the qualification fulfills a criterion.

In Example 51, the controller according to example 50 may optionally further include that the criterion is fulfilled when the qualification of the automated (e.g., autonomous) machine is greater than a qualification of each automated (e.g., autonomous) machine of the one or more further automated (e.g., autonomous) machines to perform the first task.

In Example 52, the controller according to example 50 or 51 may optionally further include that the criterion is fulfilled when a first automated (e.g., autonomous) machine of the one or more further automated (e.g., autonomous) machines, which has a higher qualification to perform the first task, at least partially fails to complete the first task.

In Example 53, the controller according to any one of examples 49 to 52 may optionally further include that the negotiation includes, for each task of the one or more tasks, determining whether another automated (e.g., autonomous) machine of the one or more further automated (e.g., autonomous) machines is more qualified than the automated (e.g., autonomous) machine for carrying out the task, based on the result of the comparison.

In Example 54, the controller according to any one of examples 49 to 53 may optionally further include that the comparison includes comparing the information about one or more functions of the automated (e.g., autonomous) machine with further information about one or more further functions of the one or more further automated (e.g., autonomous) machines.

In Example 55, the controller according to example 54 may optionally further include that the processor is configured to obtain the further information from the one or more further automated (e.g., autonomous) machines.

In Example 56, the controller according to example 54 or 55 may optionally further include that the negotiation is further based on the comparison of the further information with the information and/or with the one or more tasks.

In Example 57, the controller according to any one of examples 54 to 56 may optionally further include that the negotiation includes, for each task of the one or more tasks, determining whether another automated (e.g., autonomous) machine of the one or more further automated (e.g., autonomous) machines is more qualified than the automated (e.g., autonomous) machine for carrying out the task, based on the further information.

In Example 58, the controller according to any one of examples 49 to 57 may optionally further include that the negotiation includes allocating the task to the automated (e.g., autonomous) machine when the processor determines that the automated (e.g., autonomous) machine is more qualified than any other automated (e.g., autonomous) machine of the one or more further automated (e.g., autonomous) machines for carrying out the task.

In Example 59, the controller according to any one of examples 49 to 58 may optionally further include that the negotiation includes allocating the task to another automated (e.g., autonomous) machine of the one or more further automated (e.g., autonomous) machines, when the processor determines that the other automated (e.g., autonomous) machine is more qualified than the automated (e.g., autonomous) machine for carrying out the task.

In Example 60, the controller according to any one of examples 49 to 59 may optionally further include that the processor is configured to obtain an indication that a first automated (e.g., autonomous) machine of the one or more further automated (e.g., autonomous) machines at least partially failed to carry out a task of the one or more tasks allocated to the first automated (e.g., autonomous) machine, and to allocate the task to the automated (e.g., autonomous) machine.

In Example 61, the controller according to any one of examples 49 to 60 may optionally further include that each task of the one or more tasks has a priority associated therewith, and that the processor is configured to assign each task of the one or more tasks to a respective time slot based on a respective priority of each task, and that the processor is configured to control an execution of the task allocated to the automated (e.g., autonomous) machine during the respective time slot assigned to the task.

In Example 62, the controller according to any one of examples 49 to 60 may optionally further include that the processor is configured to control an execution of the task allocated to the automated (e.g., autonomous) machine in synchronization with the execution of a further task of the one or more tasks allocated to another automated (e.g., autonomous) machine of the one or more further automated (e.g., autonomous) machines.

In Example 63, the controller according to any one of examples 49 to 62 may optionally further include that the information about the one or more functions of the automated (e.g., autonomous) machine include information about at least one of: a current operational condition of the automated (e.g., autonomous) machine, a current location of the automated (e.g., autonomous) machine, an availability of the automated (e.g., autonomous) machine, and one or more operational parameters associated with the automated (e.g., autonomous) machine.

In Example 64, the controller according to any one of examples 49 to 63 may optionally further include that the processors is configured to determine the information about one or more functions of the automated (e.g., autonomous) machine in accordance with a permit associated with the automated (e.g., autonomous) machine, wherein the permit describes the capabilities and the authorizations associated with the automated (e.g., autonomous) machine.

In Example 65, the controller according to any one of examples 49 to 64 may optionally further include that the processor is configured to close the negotiation when, for each task of the one or more tasks, one automated (e.g., autonomous) machine of the plurality of automated (e.g., autonomous) machines is allocated to the task.

In Example 66, the controller according to any one of examples 49 to 65 may optionally further include that the negotiation includes generating a message to the one or more further automated (e.g., autonomous) machines, the message including a result of the comparison.

In Example 67, the controller according to any one of examples 49 to 66 may optionally further include that the result of the comparison includes a candidature of the automated (e.g., autonomous) machine for a task of the one or more tasks.

In Example 68, the controller according to any one of examples 49 to 67 may optionally further include that the comparison includes comparing a rating attributed to each of the one or more functions of the automated (e.g., autonomous) machine with the information about the one or more tasks.

In Example 69, the controller according to any one of examples 49 to 68 may optionally further include that the processor is further configured to receive information about an execution of a task allocated to another automated (e.g., autonomous) machine of the one or more automated (e.g., autonomous) machines, and to scale up or down the capabilities of the automated (e.g., autonomous) machine based on the received information.

Example 70 is a controller for an automated (e.g., autonomous) machine, the controller including: one or more processors configured to: negotiate, with one or more further automated (e.g., autonomous) machines and based on mission data, which automated (e.g., autonomous) machine of a plurality of automated (e.g., autonomous) machines becomes an allocator for the mission data, the mission data including information about one or more tasks offered to a plurality of automated (e.g., autonomous) machines including the automated (e.g., autonomous) machine and one or more further automated (e.g., autonomous) machines; and associate at least one task of the one or more tasks to the automated (e.g., autonomous) machine based on a message that the allocator generates in accordance with a wireless communication protocol.

In Example 71, the controller according to example 70 may optionally further include that the information about the one or more tasks include a priority associated with each task of the one or more tasks, and wherein the processor is configured to negotiate which automated (e.g., autonomous) machine of the plurality of automated (e.g., autonomous) machines becomes an allocator for the mission data in accordance with which automated (e.g., autonomous) machine of the plurality of automated (e.g., autonomous) machines is most qualified for carrying out the task with the highest priority associated therewith.

In Example 72, the controller according to example 70 or 71 may optionally further include that the processor is configured to obtain information about one or more functions of the one or more further automated (e.g., autonomous) machines, and wherein the negotiation includes voting for which automated (e.g., autonomous) machine of the plurality of automated (e.g., autonomous) machines becomes an allocator for the mission data in accordance with information about one or more functions of the automated (e.g., autonomous) machine and with the information about the one or more functions of the one or more further automated (e.g., autonomous) machines.

In Example 73, the controller according to example 72 may optionally further include that the information about the one or more functions of the one or more further automated (e.g., autonomous) machines include at least one of a residual battery life and/or a workload associated with the one or more further automated (e.g., autonomous) machines, and that the information about the one or more functions of the automated (e.g., autonomous) machine include at least one of a residual battery life and/or a workload associated with the automated (e.g., autonomous) machine.

In Example 74, the controller according to example 73 may optionally further include that the negotiation includes voting for which automated (e.g., autonomous) machine of the plurality of automated (e.g., autonomous) machines becomes an allocator for the mission data in accordance with which automated (e.g., autonomous) machine of the plurality of automated (e.g., autonomous) machines has the greatest battery life and/or the least workload associated therewith.

In Example 75, the controller according to any one of examples 70 to 74 may optionally further include that the negotiation includes voting for which automated (e.g., autonomous) machine of the plurality of automated (e.g., autonomous) machines becomes an allocator for the mission data and selecting which automated (e.g., autonomous) machine of the plurality of automated (e.g., autonomous) machines becomes the allocator for the mission data in accordance with a result of the vote.

In Example 76, the controller according to any one of examples 70 to 75 may optionally further include that the negotiation includes selecting which automated (e.g., autonomous) machine of the plurality of automated (e.g., autonomous) machines becomes the allocator for the mission data based on which automated (e.g., autonomous) machine of the plurality of automated (e.g., autonomous) machines received the greatest number of votes.

Example 77 is a controller for an automated (e.g., autonomous) machine, the controller including: one or more processors configured to: compare mission data with information about one or more functions of a further automated (e.g., autonomous) machine, the mission data including information about one or more tasks offered to a plurality of automated (e.g., autonomous) machines including the automated (e.g., autonomous) machine and the further automated (e.g., autonomous) machine; and allocate at least one task of the one or more tasks to the further automated (e.g., autonomous) machine based on a result of the comparison.

Example 78 is a controller for an automated (e.g., autonomous) machine, the controller including: one or more processors configured to: compare information about one or more functions of the automated (e.g., autonomous) machine with information about one or more tasks available to a plurality of automated (e.g., autonomous) machines including the automated (e.g., autonomous) machine and one or more further automated (e.g., autonomous) machines; generate a message in accordance with a wireless communication protocol to the one or more further automated (e.g., autonomous) machines of the plurality of automated (e.g., autonomous) machines, the message being based on the comparison.

In Example 79, the controller according to example 78 may optionally further include that the processor is further configured to negotiate a mission group with the one or more further automated (e.g., autonomous) machines in accordance with a group communication protocol via one or more communication interfaces.

In Example 80, the controller according to example 79 may optionally further include that the processor is further configured to negotiate the mission group based on the result of the comparison and/or based on a capability of the one or more further automated (e.g., autonomous) machines communicated to the automated (e.g., autonomous) machine in accordance with the group communication protocol via the one or more communication interfaces.

Example 81 is a system including a first automated (e.g., autonomous) machine and a second automated (e.g., autonomous) machine, the first automated (e.g., autonomous) machine including a first controller, the first controller including a first processor configured to: obtain information about one or more tasks offered to the group of automated (e.g., autonomous) machines; compare information about one or more functions of the first automated (e.g., autonomous) machine with the received information about the one or more tasks; and negotiate, with the second automated (e.g., autonomous) machine and based on a result of the comparison, which task of the one or more tasks is allocated to the first automated (e.g., autonomous) machine.

Example 82 is a controller for an automated (e.g., autonomous) machine, the controller including: a processor configured to: compare information about a function of the automated machine with information of a set of tasks available to a plurality of automated machines; negotiate, with the other automated machines of the plurality of automated machines and based on a result of the comparison, which task of the set of tasks is allocated to the automated machine.

In Example 83, the controller according to example 82 may optionally further include one or more of the features according to any one of examples 50 to 69.

Example 84 is a controller for an automated machine, the controller including: a processor configured to: negotiate, with other automated machines of a plurality of automated machines based on mission data, which automated machine becomes an allocator for the mission data, the mission data including information about a set of tasks offered to the plurality of automated machines; and associate a task of the set of tasks to the automated machine based on a message that the allocator generates in accordance with a wireless communication protocol.

In Example 85, the controller according to example 84 may optionally further include one or more of the features according to any one of examples 71 to 76.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A controller for an automated machine, the controller comprising:
   a processor configured to:
      compare information about a function of the automated machine with information of a set of tasks available to a plurality of automated machines;
      perform a negotiation, with the other automated machines of the plurality of automated machines, wherein the negotiation is based on a result of the comparison, wherein the negotiation is to determine an allocated task of the set of tasks that is allocated to the automated machine, wherein the negotiation comprises a tally of received votes from each other automated machine of the plurality of automated machines, wherein the received votes indicate which tasks of the set of tasks each other automated machine has voted to allocate as the allocated task to the automated machine;
      determine the allocated task for the automated machine based on the tally; and
      control movements of the automated machine according to the allocated task.

2. The controller according to claim 1,
   wherein the comparison comprises: determining a qualification of the automated machine to perform a first task of the set of tasks based on the information about the function of the automated machine.

3. The controller according to claim 2,
   wherein the comparison comprises whether the qualification of the automated machine is greater than a qualification of other automated machines of the plurality of automated machines to perform the first task.

4. The controller according to claim 2,
   wherein the comparison comprises whether a first automated machine of the plurality of automated machines has a higher qualification to perform the first task and at least partially fails to complete the first task.

5. The controller according to claim 1,
   wherein the negotiation comprises, for each task of the set of tasks, determining whether another automated machine of the other automated machines is more qualified than the automated machine for carrying out the allocated task, based on the result of the comparison.

6. The controller according to claim 1,
wherein the comparison comprises comparing the information about the function of the automated machine with information about other functions of the other automated machines.

7. The controller according to claim 6,
wherein the negotiation comprises, for each task of the set of tasks, determining whether another automated machine of the other automated machines is more qualified than the automated machine for carrying out the allocated task, based on the information about the other functions.

8. The controller according to claim 1,
wherein the information about the function of the automated machine comprise information about at least one of: a current operational condition of the automated machine, a current location of the automated machine, an availability of the automated machine, and one or more operational parameters associated with the automated machine.

9. The controller according to claim 1,
wherein the processor is configured to determine the information about the function of the automated machine in accordance with a permit associated with the automated machine, wherein the permit describes capabilities and authorizations associated with the automated machine.

10. The controller according to claim 1,
wherein the processor is configured to close the negotiation when the automated machine accepts the allocated task.

11. The controller according to claim 1,
wherein the processor is further configured to receive information about an execution of a task allocated to another automated machine of the plurality of automated machines, and to scale up or down capabilities of the automated machine based on the received information.

12. A non-transitory computer readable medium, having stored thereon, program instructions that when executed by a computing device, cause the computing device to perform operations comprising:
comparing information about a function of an automated machine with information about a set tasks available to a plurality of automated machines; and
performing a negotiation, with the other automated machines of the plurality of automated machines, wherein the negotiation is based on a result of the comparison, wherein the negotiation is to determine an allocated task of the set of tasks that is allocated to the automated machine, wherein the negotiation comprises a tally of received votes from each other automated machine of the plurality of automated machines, wherein the received votes indicate which tasks of the set of tasks each other automated machine has voted to allocate as the allocated task to the automated machine;
determining the allocated task for the automated machine based on the tally; and
controlling movements of the automated machine according to the allocated task.

* * * * *